United States Patent
Bao et al.

(10) Patent No.: US 12,439,338 B2
(45) Date of Patent: Oct. 7, 2025

(54) WAKE-UP SIGNAL CONFIGURATION METHOD, WAKE-UP SIGNAL PROCESSING METHOD, AND RELATED DEVICE

(71) Applicant: VIVO MOBILE COMMUNICATION CO., LTD., Dongguan (CN)

(72) Inventors: Wei Bao, Dongguan (CN); Dajie Jiang, Dongguan (CN); Li Chen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 705 days.

(21) Appl. No.: 17/737,992

(22) Filed: May 5, 2022

(65) Prior Publication Data

US 2022/0264462 A1 Aug. 18, 2022

Related U.S. Application Data

(63) Continuation of application No. PCT/CN2020/137147, filed on Dec. 17, 2020.

(30) Foreign Application Priority Data

Dec. 24, 2019 (CN) .......................... 201911349111.2

(51) Int. Cl.
H04W 52/02 (2009.01)

(52) U.S. Cl.
CPC ... H04W 52/0232 (2013.01); H04W 52/0274 (2013.01)

(58) Field of Classification Search
CPC ....................... H04W 52/0232; H04W 52/0274
See application file for complete search history.

(56) References Cited

U.S. PATENT DOCUMENTS

2019/0254110 A1* 8/2019 He .................. H04L 41/0896

FOREIGN PATENT DOCUMENTS

| CN | 110198557 A | 9/2019 |
|---|---|---|
| CN | 110463328 A | 11/2019 |
| CN | 110546982 A | 12/2019 |
| EP | 3831161 A2 | 6/2021 |
| WO | 2019190205 A1 | 10/2019 |

(Continued)

OTHER PUBLICATIONS

Ericsson, "Email report [107bis#49][NR TEI16] cDRX enhancement for CA", 3GP TSG RAN2 Meeting #108, Reno, USA, Nov. 18-22, 2019, R2-1915292 (Year: 2019).*

(Continued)

*Primary Examiner* — Joseph A Bednash
(74) *Attorney, Agent, or Firm* — IPX PLLC

(57) ABSTRACT

The present disclosure provides a Wake-Up Signal (WUS) configuration method, a WUS processing method, and a related device. The WUS configuration method includes: in a case that at least two Discontinuous Reception (DRX) groups are configured for a terminal device, configuring one wake-up signal WUS or at least two WUSs for the terminal device, where the WUS includes at least two indication bits, and the at least two indication bits separately correspond to different DRX groups of the at least two DRX groups; and the at least two WUSs separately correspond to different DRX groups of the at least two DRX groups.

19 Claims, 5 Drawing Sheets

(56) References Cited

FOREIGN PATENT DOCUMENTS

WO         2019217259 A1    11/2019
WO    WO-2021092861 A1 *   5/2021

OTHER PUBLICATIONS

Intel Corporation, "RAN2 details of the wake-up signal", 3GPP TSG RAN WG2 Meetign #107bis, Chongqing, China, Oct. 14-18, 2019, R2-19127185 (Year: 2019).*
First Office Action issued in related Chinese Application No. 201911349111.2, mailed Jul. 21, 2022, 10 pages.
Ericsson, "Email report [107bis#49][NR TEI16] cDRX enhancement for CA", 3GPP TSG-RAN2 Meeting #108 R2-1915292, Nov. 12, 2019, 20 pages.
Extended European Search Report issued in related European Application No. 20905545.8, mailed Nov. 21, 2022, 11 pages.
International Search Report issued in corresponding International Application No. PCT/CN2020/137147, mailed Mar. 16, 2021, 4 pages.
Qualcomm Incorporated, "Remaining issues on WUS configurations and procedures", 3GPP TSG RAN WG1 Meeting #93 R1-1807108, May 25, 2018.

* cited by examiner

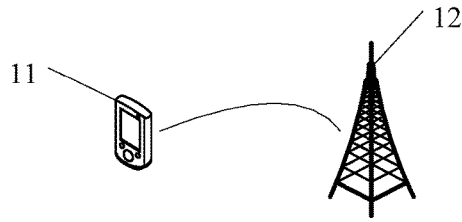

FIG. 1

In a case that at least two discontinuous reception DRX groups are configured for a terminal device, configure one wake-up signal WUS or at least two WUSs for the terminal device, where the WUS includes at least two indication bits, and the at least two indication bits separately correspond to different DRX groups of the at least two DRX groups; and the at least two WUSs separately correspond to different DRX groups of the at least two DRX group — 201

FIG. 2

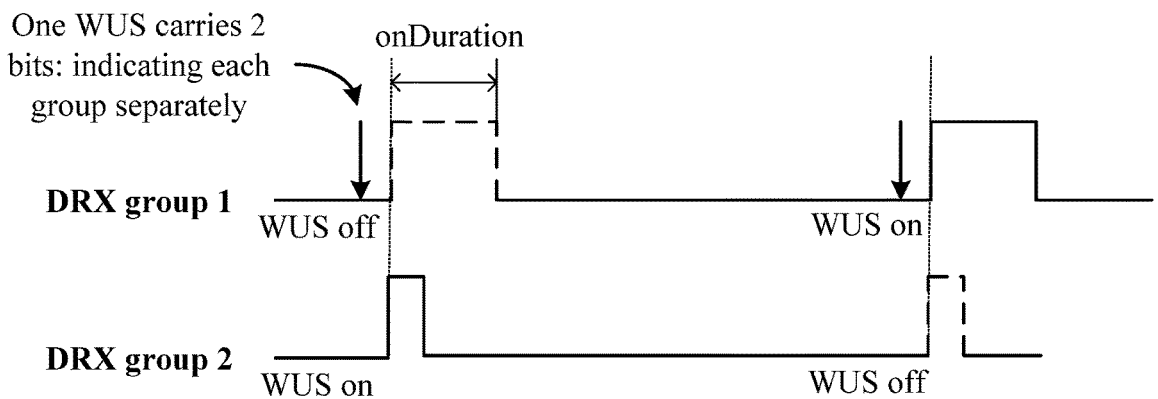

FIG. 3

Receive a wake-up signal WUS in a case that at least two discontinuous reception DRX groups are configured, where one WUS or at least two WUSs are configured for a terminal device, the WUS includes at least two indication bits, and the at least two indication bits separately correspond to different DRX groups of the at least two DRX groups; and the at least two WUSs separately correspond to different DRX groups of the at least two DRX groups — 601

FIG. 6

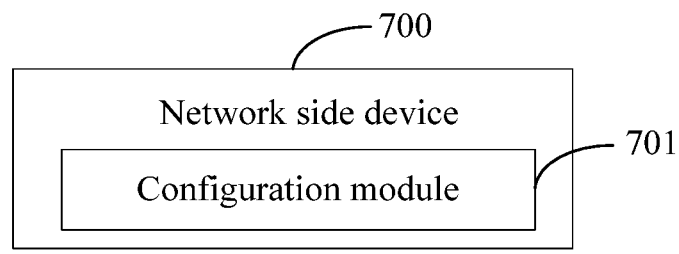

FIG. 7

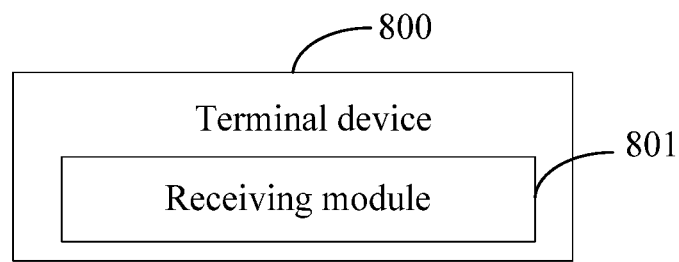

FIG. 8

WAKE-UP SIGNAL CONFIGURATION METHOD, WAKE-UP SIGNAL PROCESSING METHOD, AND RELATED DEVICE

CROSS-REFERENCE TO RELATED APPLICATIONS

This application is a continuation of International Application No. PCT/CN2020/137147, filed on Dec. 17, 2020, which claims priority to Chinese Patent Application No. 201911349111.2, filed on Dec. 24, 2019. The entire contents of each of the above-identified applications are expressly incorporated herein by reference.

TECHNICAL FIELD

The present disclosure relates to the field of communications technologies, and in particular, to a wake-up signal configuration method, a wake-up signal processing method, and a related device.

BACKGROUND

Discontinuous Reception (DRX) is performed to save power. A terminal device in a DRX state does not need to continuously monitor a Physical Downlink Control Channel (PDCCH). A network side device may configure a corresponding DRX parameter, such as a DRX cycle, an offset, and a continuous monitoring timer, for the terminal device by predicting a service data amount of the terminal device.

In an existing communications system, to further improve power saving performance of the terminal device, a PDCCH-based Wake Up Signal (WUS) is introduced. The WUS may also be referred to as Downlink Control Information (DCI) with Cyclic Redundancy Check (CRC) scrambled by a Power-Saving Radio Network Temporary Identifier (PS-RNTI), or called DCP for short. A function of the WUS is to notify the terminal device whether the PDCCH needs to be monitored during continuous monitoring duration (onDuration) of DRX, so that the terminal device can determine, based on an indication of the WUS, whether to enable an onDuration timer and whether to monitor the PDCCH in a next DRX cycle.

Currently, an operation manner of the WUS is defined based on a case that only one DRX group is configured for the terminal device. However, in a case that a plurality of DRX groups are configured for the terminal device, there is no related solution to perform a wake-up or sleep indication on the plurality of DRX groups.

SUMMARY

Embodiments of the present disclosure provide a wake-up signal configuration method, a wake-up signal processing method, and a related device, to provide a relatively flexible WUS indication solution in a case that a plurality of DRX groups are configured for a terminal device.

To solve the foregoing technical problem, the present disclosure is implemented as follows:

According to a first aspect, an embodiment of the present disclosure provides a wake-up signal configuration method. The method is applied to a network side device and includes:

in a case that at least two discontinuous reception DRX groups are configured for a terminal device, configuring one wake-up signal WUS or at least two WUSs for the terminal device, where the WUS includes at least two indication bits, the at least two indication bits separately correspond to different DRX groups of the at least two DRX groups, and each of the at least two indication bits is used to indicate whether to enable an onDuration timer of a DRX group corresponding to each indication bit in a next DRX cycle; and the at least two WUSs separately correspond to different DRX groups of the at least two DRX groups, and each of the at least two WUSs is used to indicate whether to enable an onDuration timer of a DRX group corresponding to each WUS in a next DRX cycle.

According to a second aspect, an embodiment of the present disclosure further provides a wake-up signal processing method. The method is applied to a terminal device and includes:

receiving a wake-up signal WUS in a case that at least two discontinuous reception DRX groups are configured, where one WUS or at least two WUSs are configured for the terminal device, the WUS includes at least two indication bits, the at least two indication bits separately correspond to different DRX groups of the at least two DRX groups, and each of the at least two indication bits is used to indicate whether to enable an onDuration timer of a DRX group corresponding to each indication bit in a next DRX cycle; and the at least two WUSs separately correspond to different DRX groups of the at least two DRX groups, and each of the at least two WUSs is used to indicate whether to enable an onDuration timer of a DRX group corresponding to each WUS in a next DRX cycle.

According to a third aspect, an embodiment of the present disclosure further provides a network side device. The network side device includes:

a configuration module, configured to: in a case that at least two discontinuous reception DRX groups are configured for a terminal device, configure one wake-up signal WUS or at least two WUSs for the terminal device, where the WUS includes at least two indication bits, the at least two indication bits separately correspond to different DRX groups of the at least two DRX groups, and each of the at least two indication bits is used to indicate whether to enable an onDuration timer of a DRX group corresponding to each indication bit in a next DRX cycle; and the at least two WUSs separately correspond to different DRX groups of the at least two DRX groups, and each of the at least two WUSs is used to indicate whether to enable an onDuration timer of a DRX group corresponding to each WUS in a next DRX cycle.

According to a fourth aspect, an embodiment of the present disclosure further provides a terminal device. The terminal device includes:

a receiving module, configured to receive a wake-up signal WUS in a case that at least two discontinuous reception DRX groups are configured, where one WUS or at least two WUSs are configured for the terminal device, the WUS includes at least two indication bits, the at least two indication bits separately correspond to different DRX groups of the at least two DRX groups, and each of the at least two indication bits is used to indicate whether to enable an onDuration timer of a DRX group corresponding to each indication bit in a next DRX cycle; and the at least two WUSs separately correspond to different DRX groups of the at least two DRX groups, and each of the at least two WUSs is used to indicate whether to enable an onDuration timer of a DRX group corresponding to each WUS in a next DRX cycle.

According to a fifth aspect, an embodiment of the present disclosure further provides a network side device, including a processor, a memory, and a computer program that is stored in the memory and that can be run on the processor, where when the computer program is executed by the processor, the steps of the wake-up signal configuration method provided in the first aspect are implemented.

According to a sixth aspect, an embodiment of the present disclosure further provides a terminal device, including a processor, a memory, and a computer program that is stored in the memory and that can be run on the processor, where when the computer program is executed by the processor, the steps of the wake-up signal processing method provided in the second aspect are implemented.

According to a seventh aspect, an embodiment of the present disclosure further provides a computer-readable storage medium, where the computer-readable storage medium stores a computer program, and when the computer program is executed by a processor, the steps of the wake-up signal configuration method provided in the first aspect or the steps of the wake-up signal processing method provided in the second aspect are implemented.

In the embodiments of the present disclosure, in a case that at least two DRX groups are configured for a terminal device, one WUS including at least two indication bits or at least two WUSs corresponding to different DRX groups of the at least two DRX groups are configured for the terminal device, so that the at least two indication bits in the WUS or the at least two WUSs are used to separately indicate different DRX groups of the at least two DRX groups. In this way, the terminal device may determine, based on an indication of a WUS corresponding to each DRX group, whether to wake up the corresponding DRX group, thereby improving flexibility of the indication of the WUS.

BRIEF DESCRIPTION OF DRAWINGS

To describe the technical solutions in the embodiments of the present disclosure more clearly, the following briefly introduces the accompanying drawings required for describing the embodiments of the present disclosure. Apparently, the accompanying drawings in the following description show merely some embodiments of the present disclosure, and a person of ordinary skill in the art may obtain other accompanying drawings from these accompanying drawings without creative efforts.

FIG. 1 is a structural diagram of a network system to which the embodiments of the present disclosure can be applied;

FIG. 2 is a flowchart of a wake-up signal configuration method according to an embodiment of the present disclosure;

FIG. 3 is a schematic diagram in which two bits of one WUS are used to separately indicate two DRX groups according to an embodiment of the present disclosure;

FIG. 6 is a flowchart of a wake-up signal processing method according to an embodiment of the present disclosure;

FIG. 7 is a structural diagram of a network side device according to an embodiment of the present disclosure;

FIG. 8 is a structural diagram of a terminal device according to an embodiment of the present disclosure;

DETAILED DESCRIPTION

Figure 4A:
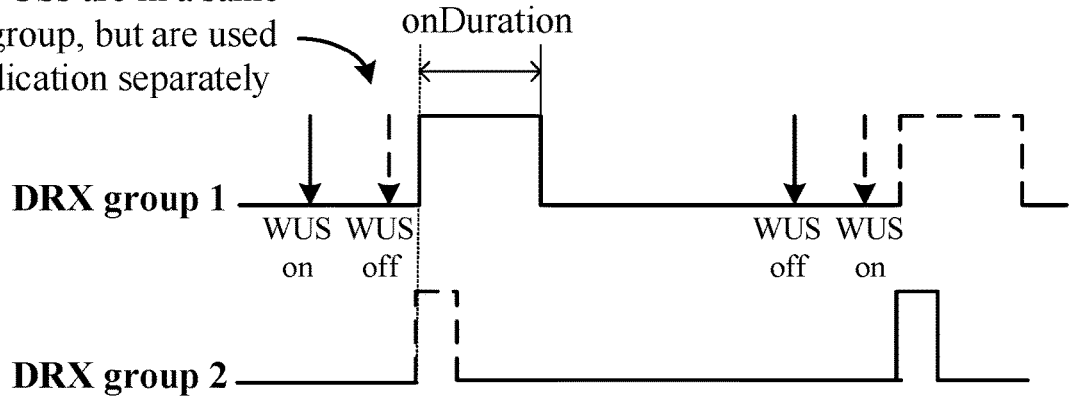
FIG. 4a is a schematic diagram in which two WUSs configured in a same DRX group are used to separately indicate two DRX groups according to an embodiment of the present disclosure.

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

In the specification and claims of this application, the terms "first", "second", and the like are intended to distinguish between similar objects but do not necessarily describe a specific order or sequence. It should be understood that the data termed in such a way is interchangeable in proper circumstances so that the embodiments of this application described herein can be implemented, for example, in an order other than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device. In addition, in the specification and claims, "and/or" is used to indicate at least one of connected objects, for example, A and/or B and/or C, and to indicate seven cases: only A, only B, only C, A and B, B and C, A and C, and A, B and C.

To facilitate understanding of the embodiments of the present disclosure, some related concepts in the embodiments of the present disclosure are first described.

1. DRX Technology

If a terminal device does not monitor a PDCCH control channel for a long time, a latency of data transmission increases once data is reached. Taking power saving and a transmission latency into consideration, the terminal device may support two DRX cycles: a long DRX cycle and a short DRX cycle based on duration of monitoring the channel by the terminal device. If it is predicted that a data amount of the terminal device is relatively frequent or a service is relatively sensitive to a latency, a network side device may configure the terminal device to use the DRX short cycle. If it is predicted that the data amount of the terminal is relatively sparse and the latency is not sensitive, the network side device may configure the terminal device to use only the long DRX cycle. To facilitate the terminal device to switch between the long DRX cycle and the short DRX cycle, it is required that the long DRX cycle is an integer multiple of the short DRX cycle, to ensure continuous monitoring time alignment between the long DRX cycle and the short DRX cycle.

To support a DRX mechanism, the network side device configures DRX-related timers and parameters for the terminal device, specifically including:

drx-LongCycleStartOffset: a cycle and an offset used to configure a long DRX cycle, where units of the cycle and the offset are milliseconds;

drx-ShortCycle: a cycle and an offset used to configure a short DRX cycle, where units of the cycle and the offset are milliseconds;

drx-ShortCycleTimer: duration used to control the terminal device to use a short DRX cycle, which is an integer, indicating that the terminal device is maintained for an integer multiple of short cycles once the terminal device enters the short DRX cycle;

drx-onDuration Timer: a DRX continuous monitoring timer, where during running of the timer, the terminal device needs to continuously monitor the PDCCH control channel of the network, and a unit of the timer is milliseconds; and drx-SlotOffset: a latency in which terminal device enables a drx-onDurationTimer, and sets, by using the parameter, an offset of a start moment of the DRX onDuration relative to a subframe start moment, where the offset is an integer multiple of 1/32 milliseconds.

2. Wake-Up Signal WUS

A function of the WUS is to notify the terminal device whether a PDCCH needs to be monitored in onDuration of a specific DRX. In a case that there is no data, the terminal device may not need to monitor the PDCCH in the onDuration. In other words, the terminal device may be in a sleep state in an entire DRX long cycle, thereby further saving power.

The WUS is DCI, and is referred to as DCP (DCI with CRC scrambled by PS-RNTI) for short, where a PS-RNTI is an RNTI that is allocated by a network to the terminal device and that is specifically used for power saving, and DCI scrambled by the PS-RNTI carries a wake-up/sleep indication for the terminal device by the network. The terminal device determines, based on the indication, whether to enable an onDuration timer and whether to monitor the PDCCH in a next DRX cycle.

Referring to FIG. 1, FIG. 1 is a structural diagram of a network system to which the embodiments of the present disclosure can be applied. As shown in FIG. 1, the network system includes a terminal device 11 and a network side device 12. The terminal device 11 may be a user side device such as a mobile phone, a tablet personal computer, a laptop computer, a Personal Digital Assistant (PDA), a Mobile Internet Device (MID), or a wearable device. It should be noted that a specific type of the terminal device 11 is not limited in the embodiments of the present disclosure. The network side device 12 may be a base station, for example, a macro base station, a Long Term Evolution (LTE) eNB, a 5G New Radio (NR) NB, or a gNB. The network side device 12 may be, according to some embodiments, a small cell, for example, a Low Power Node (LPN) pico or a femto, or the network side device 12 may be an Access Point (AP). The base station may be, according to some embodiments, a network node formed by a Central Unit (CU) and a plurality of TRPs that are managed and controlled by the CU. It should be noted that a specific type of the network side device 12 is not limited in the embodiments of the present disclosure. The network system may be a 5G communications system or a LTE communications system. This is not specifically limited.

It should be noted that a wake-up signal configuration method provided in the embodiments of the present disclosure may be performed by the foregoing network side device 12, and a wake-up signal processing method provided in the embodiments of the present disclosure may be performed by the foregoing terminal device 11. For detailed content, refer to the following descriptions.

An embodiment of the present disclosure provides a wake-up signal configuration method, applied to a network side device. Referring to FIG. 2, FIG. 2 is a flowchart of a wake-up signal configuration method according to an embodiment of the present disclosure. As shown in FIG. 2, the method includes the following steps.

Step 201: In a case that at least two discontinuous reception DRX groups are configured for a terminal device, configure one wake-up signal WUS or at least two WUSs for the terminal device.

The WUS includes at least two indication bits, the at least two indication bits separately correspond to different DRX groups of the at least two DRX groups, and each of the at least two indication bits is used to indicate whether to enable an onDuration timer of a DRX group corresponding to each indication bit in a next DRX cycle; and the at least two WUSs separately correspond to different DRX groups of the at least two DRX groups, and each of the at least two WUSs is used to indicate whether to enable an onDuration timer of a DRX group corresponding to each WUS in a next DRX cycle.

In this embodiment of the present disclosure, the network side device may configure a plurality of DRX groups for the terminal device, and configure one WUS or at least two WUSs for the terminal device. When one WUS is configured, the WUS may include at least two indication bits, and each indication bit indicates a different DRX group. When at least two WUSs are configured, each WUS may indicate a different DRX group, so that the WUS or the at least two WUSs can be used to separately instruct different DRX groups of the plurality of DRX groups of the terminal device to wake up or sleep. Therefore, the terminal device may receive a WUS and independently determine, based on a received indication, whether to enable an onDuration timer of a next cycle of each DRX group.

Different DRX groups of the at least two DRX groups may be understood as different carrier groups in which different DRX parameter sets are configured, and the DRX parameter set may include one set of DRX parameters. In actual application, Component Carriers (CCs) with different characteristics may be configured as different DRX groups, and a corresponding DRX parameter set may be configured for each DRX group.

Specifically, when the terminal device (referred to as User Equipment (UE) for short below) determines, based on a service characteristic and a characteristic of the terminal device, that power saving configuration needs to be performed, the network side device may configure a DRX parameter for the UE. When a plurality of CCs are configured/activated for the UE, if these CCs have different characteristics, for example, some CCs are at a low frequency and some CCs are at a high frequency, transmission characteristics, such as a parameter set (numerology) used for transmission, greatly vary in these two types of CCs. Therefore, a more efficient manner is to configure two different sets of DRX parameters for the UE, which are respectively used in CC groups with different characteristics. For example, all carriers at a low frequency (for example, an FR1) are configured as one DRX group 1, and a set of DRX parameters is configured for a CC in the DRX group 1, while carriers at another high frequency (for example, an FR2) are configured as a DRX group 2, and another set of DRX parameters is configured for a CC in the DRX group 2. In this way, two sets of DRX parameters are configured for the UE, which are respectively used in two groups (CC group). The UE may separately enable and maintain corresponding DRX states for the two DRX groups based on DRX parameter configurations.

Each set of DRX parameters may include parameters such as a DRX cycle (a long DRX cycle, a short DRX cycle, or the like), an offset, duration in which the UE uses the DRX short cycle, a DRX continuous monitoring timer, and a latency in which the UE enables the DRX continuous monitoring timer.

It should be noted that when one WUS is configured for the UE, at least two indication bits of the WUS separately correspond to different DRX groups of the at least two DRX groups. This may specifically include a plurality of different manners.

Manner 1: A quantity of the at least two indication bits is consistent with a quantity of the at least two DRX groups. Each indication bit indicates one DRX group, that is, each of the at least two DRX groups is independently indicated. For example, an indication bit 1 indicates a DRX group 1, an indication bit 2 indicates a DRX group 2, and an indication bit 3 indicates a DRX group 3.

Manner 2: A quantity of the at least two indication bits is less than a quantity of the at least two DRX groups, and each indication bit indicates a part of DRX groups. For example, an indication bit 1 indicates a DRX group 1 and a DRX group 2, an indication bit 2 indicates a DRX group 3 and a DRX group 4, and an indication bit 3 indicates a DRX group 5, a DRX group 6, and a DRX group 7.

Manner 3: A quantity of the at least two indication bits is less than a quantity of the at least two DRX groups, and one indication bit indicates one DRX group or a part of DRX groups. For example, an indication bit 1 indicates a DRX group 1, an indication bit 2 indicates a DRX group 2 and a DRX group 3, an indication bit 3 indicates a DRX group 4, and an indication bit 4 indicates a DRX group 5, a DRX group 6, and a DRX group 7.

It should be further noted that when one WUS is configured for the UE, the WUS may be configured in one of the at least two DRX groups, such as a primary DRX group, or a DRX group with relatively frequent data scheduling.

With reference to FIG. 3, the following uses an example in which two DRX groups are configured for the UE and one WUS including two indication bits is configured for the UE to describe an implementation in which one WUS is used to separately indicate different DRX groups.

As shown in FIG. 3, the network side device configures two DRX groups for the UE: a DRX group 1 and a DRX group 2, and configures one WUS carrying different indication bits in the DRX group 1. The following describes in detail how the two groups of DRX group perform, under control of a WUS, a wakeup operation and a sleep operation expected by the network side device.

FIG. 3 is an optional timer running state configured for two DRX groups. A DRX group 1 and a DRX group 2 may have different timer lengths, for example, an onDuration timer, an inactivity timer, a Hybrid Automatic Repeat reQuest (HARQ) Round Trip Time (RTT) timer, a HARQ Retransmission (RETX) timer, or the like. Parameters such as information indicating whether a short DRX cycle (short DRX cycle) is enabled, a duration configuration of the short DRX cycle, and a DRX cycle offset (DRX cycle offset) may have different values. A final effect is that the two DRX groups perform independent DRX state and timer maintenance based on own timer and parameter configurations and data scheduling and retransmission situations.

Based on configurations of a plurality of DRX groups, if one WUS further needs to be configured to dynamically indicate whether to enable an onDuration timer and PDCCH monitoring waked up/slept in each DRX cycle, in a feasible manner, one CC is selected from all configured/activated CCs to configure the WUS. Generally, the WUS is configured in one DRX group in a Primary cell (Pcell) or a Special cell (Spcell). For example, in FIG. 3, if the Pcell/Spcell belongs to the DRX group 1, the WUS performs monitoring in the special cell in the DRX group 1, and different bits in the WUS are used to indicate whether different DRX groups are waked up.

A basic manner of controlling two DRX groups to work together by using different indication bits (bit) of one WUS is as follows:

The UE monitors or receives a WUS on a time-frequency resource configured with the WUS, and determines, based on content indicated by different bits of the WUS, whether onDuration timers of different DRX groups are enabled in a next DRX cycle (for example, an adjacent DRX cycle of the DRX group 1 shown in FIG. 2 after a time domain location of WUS on/WUS off), to monitor a PDCCH. In this case, there are two DRX groups. The two DRX groups obtain indication information from one WUS. Because the indication information may be independent, although there is no WUS configured in a DRX group 2, an independent indication of a WUS in a DRX group 1 may be used to independently determine a timer and a monitoring state of the DRX group 2. In this way, when the UE does not need to transmit a service, one WUS may indicate that cells in all DRX groups are in a sleep state in a next DRX cycle (that is, a plurality of bits of the WUS indicate off), thereby further saving power of the UE. When a service needs to be transmitted, based on a service characteristic, one WUS may separately indicate whether to enable onDuration timers of cells in two DRX groups in a next DRX cycle and whether to monitor a PDCCH, to prepare for data transmission, that is, it can be controlled to wake only one or more DRX groups.

When at least two WUSs are configured for the UE, the at least two WUSs separately correspond to different DRX groups of the at least two DRX groups. Specifically, a plurality of different manners may be included:

Manner 1: A quantity of the at least two WUSs is consistent with a quantity of the at least two DRX groups. Each WUS indicates one DRX group, that is, each of the at least two DRX groups is independently indicated. For example, a WUS 1 indicates a DRX group 1, a WUS 2 indicates a DRX group 2, and a WUS 3 indicates a DRX group 3.

Manner 2: A quantity of the at least two WUSs is less than a quantity of the at least two DRX groups, and each WUS indicates a part of DRX groups. For example, a WUS 1 indicates a DRX group 1 and a DRX group 2, a WUS 2 indicates a DRX group 3, a DRX group 4, and a DRX group 5, and a WUS 3 indicates a DRX group 6 and a DRX group 7.

Manner 3: A quantity of the at least two WUSs is less than a quantity of the at least two DRX groups, and each WUS indicates one DRX group or a part of DRX groups. For example, a WUS 1 indicates a DRX group 1, a WUS 2 indicates a DRX group 2 and a DRX group 3, a WUS 3 indicates a DRX group 4, a DRX group 5, and a DRX group 6, and a WUS 4 indicates a DRX group 7.

In this embodiment of the present disclosure, after the WUS is configured for the terminal device, the network side device may send the WUS to the terminal device based on the configured WUS, to indicate, to the terminal device by using the sent WUS, which DRX group needs to wake up and which DRX group needs to sleep, so that the terminal device can monitor the WUS on a corresponding transmission resource based on the WUS configured by the network side device, that is, receive the WUS, and determine, based on different DRX groups separately indicated by the WUS, whether to enable an onDuration timer corresponding to a DRX group in a next DRX cycle.

Specifically, when the WUS indicates to enable onDuration timers of a part of the at least two DRX groups in a next DRX cycle (for example, the WUS corresponding to these DRX groups is a wake-up indication WUS on), the terminal device may enable the onDuration timers of these DRX groups in the next DRX cycle, and an onDuration timer of another DRX group in the next DRX cycle may not be enabled. In a case that the WUS indicates not to enable onDuration timers of some DRX groups in a next DRX cycle (for example, the WUS corresponding to these DRX groups is a sleep indication WUS off), the terminal device may not enable the onDuration timers of these DRX groups in the next DRX cycle. Certainly, if a WUS corresponding to each DRX group is a wake-up indication, onDuration timers of all DRX groups in a next DRX cycle may be enabled. If a WUS corresponding to each DRX group is a sleep indication, an onDuration timer of each DRX group in a next DRX cycle may not be enabled.

In the wake-up signal configuration method in this embodiment, in a case that at least two DRX groups are configured for a terminal device, one WUS including at least two indication bits or at least two WUSs corresponding to different DRX groups of the at least two DRX groups are configured for the terminal device, so that the at least two indication bits in the WUS or the at least two WUSs are used to separately indicate different DRX groups of the at least two DRX groups. In this way, the terminal device may determine, based on an indication of a WUS corresponding to each DRX group, whether to wake up the corresponding DRX group, so that different DRX groups of the at least two DRX groups can be separately indicated. Therefore, the indication of the WUS is more flexible and power saving.

In some embodiments, the at least two WUSs are configured in a same DRX group of the at least two DRX groups, or configured in different DRX groups of the at least two DRX groups.

In an implementation, when at least two WUSs are configured for the terminal device, the network side device may configure the at least two WUSs in a same DRX group of the at least two DRX groups. The at least two WUSs may be configured in any one of the at least two DRX groups, or the at least two WUSs may be configured in a specific DRX group in the at least two DRX groups, such as a primary DRX group, or the at least two WUSs may be configured in a DRX group in which data scheduling is relatively frequent in the at least two DRX groups.

In this embodiment, the at least two WUSs are configured in a same DRX group of the at least two DRX groups, so that a difficulty of monitoring a WUS can be reduced.

In another implementation, when at least two WUSs are configured for the terminal device, the network side device may configure the at least two WUSs in different groups of the at least two DRX groups, so that flexibility of configuring a WUS and detecting a WUS can be improved.

In some embodiments, the at least two WUSs are configured in a first DRX group, and the first DRX group is a DRX group corresponding to a Pcell) or a Spcell in the at least two DRX groups.

When a plurality of DRX groups and a plurality of WUSs are configured for the terminal device, the plurality of WUSs may be generally configured in the Pcell or the Spcell. A DRX group in which the Pcell is located may be referred to as a Pcell DRX group or a primary DRX group, and another DRX group is referred to as a Scell DRX group or a secondary DRX Group. In other words, the at least two WUSs are configured in a DRX group corresponding to the Pcell or the Spcell in the at least two DRX groups, and the terminal device may monitor the WUS in the DRX group corresponding to the Pcell or the Spcell, thereby reducing a possibility of misdetection of a WUS. In some embodiments, the at least two WUSs are configured on different transmission resources of a same DRX group of the at least two DRX groups; and the transmission resource includes at least one of the following: a time domain location, a frequency domain location, a search space, and a carrier.

When the at least two WUSs are configured in a same DRX group of the at least two DRX groups, to facilitate the terminal device to distinguish between DRX groups corresponding to different WUSs, the at least two WUSs may be configured on different transmission resources of a same DRX group of the at least two DRX groups, for example, configured at different time domain locations, different frequency domain locations, different search spaces or different carriers of a specified DRX group, or configured at different time domain locations of a specified DRX group and configured at different frequency domain locations of the DRX group, so that the terminal device can separately obtain a WUS indication signal of each DRX group from different transmission resources of a DRX group in which a WUS is configured.

Figure 4B:
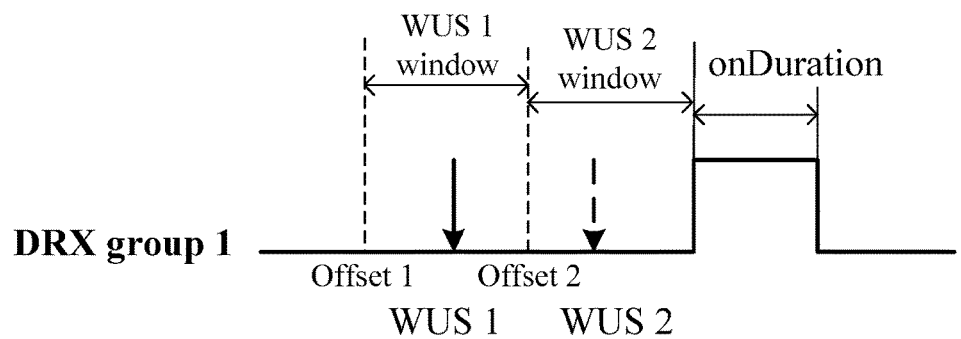
FIG. 4b is a schematic diagram in which two WUSs are separately in different time windows of a same DRX group according to an embodiment of the present disclosure.

With reference to FIG. 4*a* and FIG. 4*b*, the following uses an example in which two DRX groups and two WUSs are configured for UE to describe an implementation in which the two WUSs are configured in a same DRX group.

In this example, the two WUSs may be configured on a special CC of one DRX group. For example, the WUSs are configured in a Pcell or a Spcell of a DRX group 1, and WUSs for different DRX groups may have different time-frequency domain locations. As shown in FIG. 4*a*, a WUS represented by a solid-line arrow is for the DRX group 1, and a WUS represented by a dashed-line arrow is for a DRX group 2.

In this way, two DRX groups are controlled to work together by using different WUSs. Because each DRX group has an independent WUS location and indication, it is equivalent to that each DRX group independently detects a WUS and performs a wake-up or sleep operation based on an indication of the WUS.

Two WUSs may be configured in one DRX group, and the following different manners may be included:

Manner 1: Different time windows (window) are configured for different WUSs. For example, as shown in FIG. 4*b*, a time window of a WUS 1 is a time period from an offset 1 to an offset 2 before a start moment of onDuration of a DRX group 1, where a value of the offset 1 is greater than a value of the offset 2, and a time window of a WUS 2 is a time period from the offset 2 to a start moment of onDuration.

Manner 2: Different frequency domain locations are configured for different WUSs.

Manner 3: Different search spaces are configured for different WUSs.

Manner 4: Different CCs are configured for different WUSs.

When the at least two WUSs are configured in different DRX groups of the at least two DRX groups, based on a DRX group corresponding to each of the at least two WUSs, each WUS may be configured in the corresponding DRX group. For example, if a WUS 1 corresponds to a DRX group 1 and a WUS 2 corresponds to a DRX group 2, the WUS 1 may be configured in the DRX group 1, and the WUS 2 may be configured in the DRX group 2. For another example, if a WUS 1 corresponds to a DRX group 1 and a DRX group 2, and a WUS 2 corresponds to a DRX group 3, the WUS 1 may be configured in the DRX group 1 or the DRX group 2, and the WUS 2 is configured in the DRX group 3.

Figure 5:
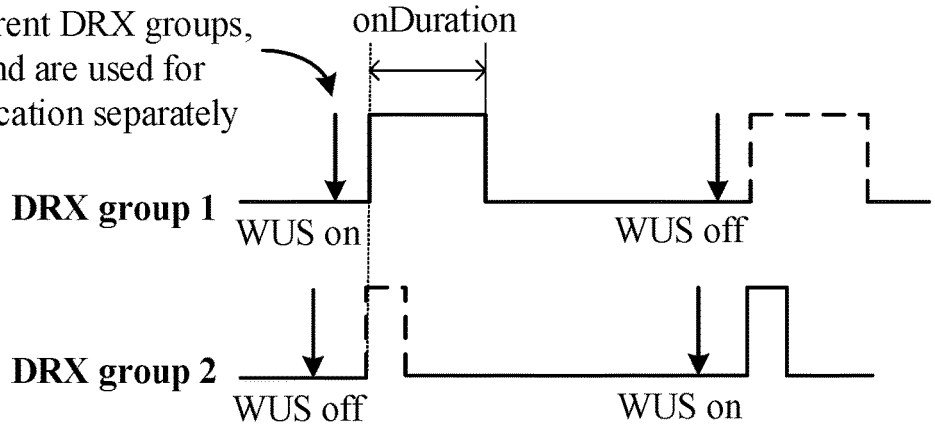
FIG. 5 is a schematic diagram in which two WUSs configured in different DRX groups are used to separately indicate two DRX groups according to an embodiment of the present disclosure.

With reference to FIG. 5, the following uses an example in which two DRX groups and two WUSs are configured for UE to describe an implementation in which the two WUSs are configured in different DRX groups.

In this example, the two WUSs may be separately configured in two DRX groups. More specifically, the two WUSs may be separately configured on special CCs of the two DRX groups. For example, for the DRX group 1, the WUSs may be configured in the Spcell. For the DRX group 2, although all cells are Scell, there may also be some special cells, for example, configured with some UE-specific information or Physical Uplink Control Channel (PUCCH). Therefore, the WUS for the DRX group 2 may be configured in the cell.

In this way, two DRX groups are controlled to work together by using different WUSs. Because each DRX group has an independent WUS configuration and indication, it is equivalent to that each DRX group independently detects a WUS and performs a wake-up or sleep operation based on an indication of the WUS.

In this implementation, the at least two WUSs are configured in a same DRX group of the at least two DRX groups, so that the terminal device can monitor a WUS in only one DRX group. The at least two WUSs are configured in different DRX groups of the at least two DRX groups, so that the terminal device can separately monitor corresponding WUSs in different DRX groups, and further directly determine, based on an indication of a WUS, whether to wake up a corresponding DRX group.

In some embodiments, the method further includes:
sending a first indication to the terminal device, where the first indication is used to indicate whether to enable an onDuration timer of a DRX group corresponding to a WUS that fails to be received in a next DRX cycle.

After the network side device configures a time-frequency location of a WUS for the UE, the UE needs to detect the WUS at the configured time-frequency location of the WUS, that is, receive the WUS. However, in actual transmission, quality of a communication link may be poor, or the UE needs to perform another high-priority operation, and consequently the UE fails to correctly detect the WUS, that is, the WUS fails to be received. Therefore, it cannot be learned whether there is a wake-up indication or a sleep indication in a next DRX cycle notified by the network side device. In this case, a behavior of the UE in the at least two DRX groups needs to be clearly specified, to ensure that the behavior of the UE is in a range that can be controlled by the network side device.

This implementation is a corresponding processing solution for how the at least two DRX groups of the UE perform monitoring in a next DRX cycle in a case that a WUS fails to be received. Details are as follows:

A corresponding indication may be preconfigured for the UE to notify the UE of how to determine a monitoring behavior of the UE. Specifically, the first indication may be predefined in a protocol or configured by the network side device, to indicate the UE whether to enable an onDuration timer of a DRX group corresponding to a WUS that fails to be received in a next DRX cycle in a case that the WUS fails to be received. When the network side device configures the first indication for the UE, the network side device may deliver the configured first indication to the UE, so that the UE can determine, based on the first indication, whether to enable an onDuration timer of a DRX group in a next DRX cycle in a case that a WUS corresponding to the DRX group fails to be received.

The first indication may indicate the UE to enable only onDuration timers of a part of all DRX groups corresponding to WUSs that fail to be received in a next DRX cycle, for example, to enable only onDuration timers of a primary DRX group and a DRX group in which there is currently data scheduling in the DRX groups corresponding to the WUSs that fail to be received in the next DRX cycle, to ensure a service of the terminal and save transmission resources. In some embodiments, the first indication may indicate the UE to enable onDuration timers of all DRX groups corresponding to WUSs that fail to be received in a next DRX cycle, to preferentially ensure service transmission of the terminal. In some embodiments, the first indication may indicate that onDuration timers of all DRX groups corresponding to WUSs that fail to be received in a next DRX cycle are not enabled, to preferentially save transmission resources and power.

The first indication may include one sub-indication, and the sub-indication corresponds to all of the at least two DRX groups; or the first indication includes at least two sub-indications, and the at least two sub-indications separately correspond to different DRX groups of the at least two DRX groups.

That is, a common indication may be configured for the at least two DRX groups, to indicate the UE to simultaneously enable or not to simultaneously enable onDuration timers of all DRX groups corresponding to WUSs that fail to be received in a next DRX cycle. In some embodiments, an independent indication may be configured for each of the at least two DRX groups, or a common indication may be configured for a part of the at least two DRX groups, and an independent indication is configured for each of another part of the at least two DRX groups, to indicate the UE to enable or not to enable onDuration timers of a part of DRX groups corresponding to WUSs that fail to be received in a next DRX cycle, or indicate the UE to separately enable or not to enable an onDuration timer of a specified DRX group corresponding to a WUS that fails to be received in a next DRX cycle.

For example, the network side device may configure, by using Radio Resource Control (RRC) signaling, that a DRX group corresponding to a WUS that fails to be received is in a wake-up state or a sleep state when the UE misses detecting/incorrectly detects the WUS. The network side device may configure a common WUS misdetection state indicator (WUS misdetection state indicator) for a primary DRX group and a secondary DRX group, or may configure independent WUS misdetection state indicators for a primary DRX group and a secondary DRX group.

For example, when the common WUS misdetection state indicator is configured as on, if WUS misdetection occurs in a part of DRX groups of the UE, the UE simultaneously enables onDuration timers of these DRX groups in a next DRX cycle by default and monitors a PDCCH. When the common WUS misdetection state indicator is configured as off, if WUS misdetection occurs in a part of DRX groups of the UE, the UE does not enable onDuration timers of these DRX groups in a next DRX cycle by default, and does not monitor a PDCCH.

When the independent WUS misdetection state indicators are separately configured, if WUS misdetection occurs in a part of DRX groups of the UE, the UE independently determines, based on an indication configured for each DRX group, whether to enable an onDuration timer of each DRX group corresponding to a WUS that fails to be received in a next DRX cycle and whether to monitor a PDCCH.

In this way, in a case that the WUS fails to be received, a monitoring behavior of a DRX group corresponding to the WUS that fails to be received in a next DRX cycle is determined by using the foregoing solution, so that it can be ensured that a behavior of the UE is in a range that can be controlled by the network side device, and a service of the terminal can be normally performed or transmission resources of the terminal can be reduced. An embodiment of the present disclosure provides a wake-up signal processing method, applied to a terminal device. Referring to FIG. 6, FIG. 6 is a flowchart of a wake-up signal processing method according to an embodiment of the present disclosure. As shown in FIG. 6, the method includes the following steps.

Step 601: Receive a wake-up signal WUS in a case that at least two discontinuous reception DRX groups are configured.

One WUS or at least two WUSs are configured for the terminal device, the WUS includes at least two indication bits, the at least two indication bits separately correspond to different DRX groups of the at least two DRX groups, and each of the at least two indication bits is used to indicate whether to enable an onDuration timer of a DRX group corresponding to each indication bit in a next DRX cycle; and the at least two WUSs separately correspond to different DRX groups of the at least two DRX groups, and each of the at least two WUSs is used to indicate whether to enable an onDuration timer of a DRX group corresponding to each WUS in a next DRX cycle.

In this embodiment, in a case that one WUS is configured for the terminal device, the terminal device may monitor or receive a WUS on a time-frequency resource on which the WUS is configured, and determine, based on content indicated by different indication bits of the received WUS, whether to enable onDuration timers of different DRX groups in a next DRX cycle. In a case that at least two WUSs are configured for the terminal device, the terminal device may monitor or receive a WUS on a time-frequency resource on which the WUS is configured, and determine, based on the received WUS, whether to enable an onDuration timer of a DRX group corresponding to the WUS in a next DRX cycle.

It should be noted that this embodiment is used as an implementation of the terminal device corresponding to the embodiment shown in FIG. 2. For a specific implementation, refer to the related descriptions of the embodiment shown in FIG. 2. To avoid repeated descriptions, details are not described again in this embodiment.

In some embodiments, the at least two WUSs are configured in a same DRX group of the at least two DRX groups, or configured in different DRX groups of the at least two DRX groups.

In some embodiments, the at least two WUSs are configured on different transmission resources of a same DRX group of the at least two DRX groups; and
the transmission resource includes at least one of the following: a time domain location, a frequency domain location, a search space, and a carrier.

In some embodiments, the at least two WUSs are configured in a first DRX group, and the first DRX group is a DRX group corresponding to a Pcell or a Spcell in the at least two DRX groups.

For the foregoing optional implementation, refer to the related descriptions in the embodiment shown in FIG. 2. To avoid repetition, details are not described in this embodiment.

In some embodiments, at least two WUSs are configured for the terminal device, and the method further includes:
in a case that a time domain location of a first WUS is in an active time of a second DRX group, quitting receiving the first WUS, and enabling an onDuration timer of the second DRX group in a next DRX cycle, where
the first WUS is a WUS corresponding to the second DRX group, and the second DRX group is a DRX group in which a WUS is configured in the at least two DRX groups.

In a process of using a plurality of WUSs to control wake-up/sleep states of a plurality of DRX groups, a special case needs to be further considered and resolved. For example, when a data service is being performed in a part of DRX groups of UE, these DRX groups are already in a wake-up working state, and in this case, it may be considered whether to monitor a WUS, that is, to receive the WUS.

In other words, in a case that at least two WUSs are configured for the terminal device, it may be determined, based on a relationship between a time domain location of each WUS and an active time of a corresponding DRX group, whether to receive each WUS. For example, when a time domain location of a specified WUS is in an active time of a corresponding DRX group, it may be determined that a data service is more likely to be performed in the DRX group in a next DRX cycle, so that receiving of the WUS can be quit and an onDuration timer of the DRX group in a next DRX cycle can be directly enabled.

Specifically, consideration may be made separately based on whether the at least two WUSs are configured in a same DRX group or in different DRX groups:
in a case that the at least two WUSs are configured in a same DRX group, for example, configured in the second DRX group in the at least two DRX groups, it may be determined, based on whether the second DRX group is in the active time, whether the time domain location of the first WUS corresponding to the second DRX group conflicts with the active time of the second DRX group, and further determine, based on whether there is a conflict, whether to monitor the first WUS, that is, whether to receive the first WUS.

Specifically, in a case that the time domain location of the first WUS is in the active time of the second DRX group, it may be determined that the time domain location of the first WUS conflicts with the active time of the second DRX group, so that receiving of the first WUS is quit and the onDuration timer of the second DRX group in the next DRX cycle is enabled. In a case that the time domain location of the first WUS is not in the active time of the second DRX group, or the time domain location of the first WUS is in a non-active time of the second DRX group, it may be determined that the time domain location of the first WUS does not conflict with the active time of the second DRX group, so that the first WUS is received, to determine, based on an indication of the first WUS, whether to enable the onDuration timer of the second DRX group in the next DRX cycle.

For example, a WUS 1 corresponds to a DRX group 1, a WUS 2 corresponds to a DRX group 2, and both the WUS 1 and the WUS 2 are configured in the DRX group 1. In a case that a time domain location of the WUS 1 is in an active time of the DRX group 1, receiving of the WUS 1 may be quit, and an onDuration timer of the DRX group 1 in a next DRX cycle is enabled.

It should be noted that, for another WUS corresponding to another DRX group in the at least two DRX groups, whether to receive the WUS may also be determined based on whether a time domain location thereof is in an active time of the second DRX group, or may be determined based on whether a time domain location thereof is in an activate time of a corresponding DRX group.

In a case that the at least two WUSs are configured in different DRX groups, for example, a WUS 1 is configured in a DRX group 1, and a WUS 2 is configured in a DRX group 2, it may be determined, based on whether a DRX group corresponding to each WUS is in an active time, whether a time domain location of a WUS corresponding to each DRX group conflicts with an active time of the DRX group, and then it is determined, based on whether there is a conflict, whether to monitor the WUS corresponding to the DRX group.

Specifically, in a case that a time domain location of a WUS corresponding to a specified DRX group is in an active time of the DRX group, it may be determined that the time domain location of the WUS conflicts with the active time of the DRX group, so that receiving of the WUS is quit and an onDuration timer of the DRX group in a next DRX cycle is enabled. In a case that a time domain location of a WUS corresponding to a specified DRX is not in an active time of the DRX group, or the time domain location of the WUS is in a non-active time of the DRX group, it may be determined that the time domain location of the WUS does not conflict with the active time of the DRX group, so that the WUS is received, to determine, based on an indication of the WUS, whether to enable an onDuration timer of the DRX group in a next DRX cycle.

For example, a WUS 1 corresponds to a DRX group 1, a WUS 2 corresponds to a DRX group 2, the WUS 1 is configured in the DRX group 1, and the WUS 2 is configured in the DRX group 2. In a case that a time domain location of the WUS 1 is in an active time of the DRX group 1, receiving of the WUS 1 may be quit, and an onDuration timer of the DRX group 1 in a next DRX cycle is enabled. In a case that a time domain location of the WUS 2 is in an active time of the DRX group 2, receiving of the WUS 2 may be quit, and an onDuration timer of the DRX group 2 in a next DRX cycle is enabled.

In this embodiment of the present disclosure, in a case that the at least two WUSs are separately configured in different DRX groups, a WUS may be monitored on a time-frequency resource on which the WUS is configured, and it is determined, based on content indicated by the WUS, whether to enable an onDuration timer of each DRX group in a next DRX cycle and whether to monitor a PDCCH. In this case, a plurality of DRX groups have own WUS configurations, and a respective WUS is configured in a DRX group.

Therefore, it is relatively simple to consider whether a time-frequency location of the WUS conflicts with an active time. For the WUS, only an active or a non-active state of the DRX group needs to be considered. The WUS is detected only when the location of the WUS is in a non-Active state. When the location of the WUS is in an active state, the WUS does not need to be detected, and an onDuration timer is directly enabled in a next DRX cycle and a PDCCH is monitored.

In this way, it is determined, based on a relationship between a time domain location of each WUS and an active time of a corresponding DRX group, whether to receive a WUS corresponding to each DRX group, so that transmission resources and power can be saved.

In some embodiments, at least two WUSs are configured for the terminal device, and step 601 includes:
receiving a second WUS in a case that a time domain location of the second WUS is in a non-active time of a third DRX group, where
the second WUS is a WUS corresponding to the third DRX group, and the third DRX group is a DRX group in which a WUS is configured in the at least two DRX groups.

In this manner, in a case that at least two WUSs are configured for the terminal device, it may be determined, based on a relationship between a time domain location of each WUS and an active time of a corresponding DRX group, whether to receive each WUS. For example, when a time domain location of a specified WUS is in a non-active time of a corresponding DRX group, that is, there is no data transmission in the DRX group, it is better to indicate whether there is data transmission in a next DRX cycle through a corresponding WUS. Therefore, the WUS may be detected in the DRX group, and it is determined, based on an indication of the WUS, whether to enable the DRX group to wake up or sleep.

Specifically, consideration may also be made separately based on whether the at least two WUSs are configured in a same DRX group or in different DRX groups:
in a case that the at least two WUSs are configured in a same DRX group, for example, configured in the third DRX group in the at least two DRX groups, it may be determined, based on whether the third DRX group is in the non-active time, whether the time domain location of the second WUS corresponding to the third DRX group conflicts with the active time of the third DRX group, and further determine, based on whether there is a conflict, whether to monitor the second WUS, that is, whether to receive the second WUS.

Specifically, in a case that the time domain location of the second WUS is in the non-active time of the third DRX group, it may be determined that the time domain location of the second WUS does not conflict with the active time of the third DRX group, so that the second WUS is received, to determine, based on an indication of the second WUS, whether to enable the onDuration timer of the third DRX group in the next DRX cycle. In a case that the time domain location of the second WUS is not in the non-active time of the third DRX group, or the time domain location of the second WUS is in an active time of the third DRX group, it may be determined that the time domain location of the second WUS conflicts with the active time of the third DRX group, so that receiving of the second WUS is quit and the onDuration timer of the third DRX group in the next DRX cycle is enabled.

For example, a WUS 1 corresponds to a DRX group 1, a WUS 2 corresponds to a DRX group 2, and both the WUS 1 and the WUS 2 are configured in the DRX group 1. The WUS 1 may be received in a case that a time domain location of the WUS 1 is in a non-active time of the DRX group 1.

It should be noted that, for another WUS corresponding to another DRX group in the at least two DRX groups, whether to receive the WUS may also be determined based on whether a time domain location thereof is in a non-active time of the second DRX group, or may be determined based on whether a time domain location thereof is in a non-active time of a corresponding DRX group.

In a case that the at least two WUSs are configured in different DRX groups, for example, a WUS 1 is configured in a DRX group 1, and a WUS 2 is configured in a DRX group 2, it may be determined, based on whether a DRX group corresponding to each WUS is in a non-active time, whether a time domain location of a WUS corresponding to each DRX group conflicts with an active time of the DRX group, and then it is determined, based on whether there is a conflict, whether to monitor the WUS corresponding to the DRX group.

Specifically, in a case that a time domain location of a WUS corresponding to a specified DRX group is in a non-active time of the DRX group, it may be determined that the time domain location of the WUS does not conflict with the active time of the DRX group, so that the WUS is received, to determine, based on an indication of the WUS, whether to enable an onDuration timer of the DRX group in a next DRX cycle. In a case that a time domain location of a WUS corresponding to a specified DRX is not in a non-active time of the DRX group, or the time domain location of the WUS is in an active time of the DRX group, it may be determined that the time domain location of the WUS conflicts with the active time of the DRX group, so that receiving of the WUS is quit and an onDuration timer of the DRX group in a next DRX cycle is enabled.

For example, a WUS 1 corresponds to a DRX group 1, a WUS 2 corresponds to a DRX group 2, the WUS 1 is configured in the DRX group 1, and the WUS 2 is configured in the DRX group 2. The WUS 1 may be received in a case that a time domain location of the WUS 1 is in a non-active time of the DRX group 1, and the WUS 2 may be received in a case that a time domain location of the WUS 2 is in a non-active time of the DRX group 2.

In this way, it is determined, based on a relationship between a time domain location of each WUS and a non-active time of a corresponding DRX group, whether to receive a WUS corresponding to each DRX group, so that a service of the terminal can be better ensured.

In some embodiments, at least two WUSs are configured for the terminal device, the at least two WUSs are configured in a fourth DRX group of the at least two DRX groups, and the method further includes any one of the following:

in a case that a time domain location of a third WUS is in an active time of the fourth DRX group, quitting receiving the third WUS, and enabling an onDuration timer of a fifth DRX group in a next DRX cycle;

in a case that the time domain location of the third WUS is in an active time of the fifth DRX group, quitting receiving the third WUS, and enabling the onDuration timer of the fifth DRX group in the next DRX cycle; and in a case that the time domain location of the third WUS is in the active time of the fourth DRX group and the active time of the fifth DRX group, quitting receiving the third WUS, and enabling the onDuration timer of the fifth DRX group in the next DRX cycle, where the third WUS is a WUS corresponding to the fifth DRX group, and the fifth DRX group is a DRX group other than the fourth DRX group in the at least two DRX groups.

In this embodiment, in a case that at least two WUSs are configured for the terminal device, and the at least two WUSs are configured in a same DRX group, for example, the at least two WUSs are configured in the fourth DRX group in the at least two DRX groups, for a WUS corresponding to a DRX group other than the fourth DRX group in the at least two DRX groups, whether the WUS needs to be received may be determined based on a relationship between a time domain location thereof and the active time of the fourth DRX group and/or an active time of the corresponding DRX group. Specifically, a plurality of different manners may be included:

In one manner, whether the third WUS is to be received may be determined based on whether the time domain location of the third WUS is in the active time of the fourth DRX group, where the third WUS is a WUS corresponding to the fifth DRX group, and the fifth DRX group is a DRX group other than the fourth DRX group in the at least two DRX groups.

Specifically, in a case that the time domain location of the third WUS is in the active time of the fourth DRX group, that is, the fourth DRX group is currently in a PDCCH monitoring state, in order to avoid a difficulty in simultaneous detection of the fourth DRX group, receiving of the third WUS may be quit, and the onDuration timer of the fifth DRX group in the next DRX cycle is enabled to ensure a data service on the fifth DRX group.

It should be noted that, in this manner, receiving of the third WUS may be quit only in a case that the time domain location of the third WUS is in the active time of the fourth DRX group, and the third WUS is received in other cases. In other words, the third WUS may be received as long as the time domain location of the third WUS is not in the active time of the fourth DRX group, to determine, based on an indication of the third WUS, whether to enable the onDuration timer of the fifth DRX group in the next DRX cycle.

For example, a WUS 1 corresponds to a DRX group 1, a WUS 2 corresponds to a DRX group 2, and both the WUS 1 and the WUS 2 are configured in the DRX group 1. If a time domain location of the WUS 2 is in an active time of the DRX group 1, receiving of the WUS 2 may be quit, and the WUS 2 may be received in a case that the time domain location of the WUS 2 is not in the active time of the DRX group 1.

In another manner, whether to receive the third WUS may be determined based on whether the time domain location of the third WUS is in the active time of the fifth DRX group.

Specifically, in a case that the time domain location of the third WUS is in the active time of the fifth DRX group, that is, the fifth DRX group is currently in a PDCCH monitoring state, it may be speculated that a data service is more likely to be performed in the fifth DRX group in the next DRX cycle, so that receiving of the third WUS can be quit, and the onDuration timer of the fifth DRX group in the next DRX cycle is directly enabled.

It should be noted that, in this manner, receiving of the third WUS may be quit only in a case that the time domain location of the third WUS is in the active time of the fifth DRX group, and the third WUS is received in other cases. In other words, the third WUS may be received as long as the time domain location of the third WUS is not in the active time of the fifth DRX group, to determine, based on an indication of the third WUS, whether to enable the onDuration timer of the fifth DRX group in the next DRX cycle.

For example, a WUS 1 corresponds to a DRX group 1, a WUS 2 corresponds to a DRX group 2, and both the WUS 1 and the WUS 2 are configured in the DRX group 1. If a time domain location of the WUS 2 is in an active time of the DRX group 2, receiving of the WUS 2 may be quit, and the WUS 2 may be received in a case that the time domain location of the WUS 2 is not in the active time of the DRX group 2.

In still another manner, whether to receive the third WUS may be determined based on whether the time domain location of the third WUS is in the active time of the fourth DRX group and the active time of the fifth DRX group.

Specifically, in a case that the time domain location of the third WUS is in the active time of the fourth DRX group and the active time of the fifth DRX group, that is, the time domain location of the third WUS conflicts with both the active time of the fourth DRX group and the active time of the fifth DRX group, receiving of the third WUS may be quit, and the onDuration timer of the fifth DRX group in the next DRX cycle is directly enabled.

It should be noted that, in this manner, receiving of the third WUS may be quit only in a case that the time domain location of the third WUS is in the active time of the fourth DRX group and the active time of the fifth DRX group, and the third WUS is received in other cases. In other words, the third WUS may be received as long as the time domain location of the third WUS is not in the active time of the fourth DRX group or the active time of the fifth DRX group, to determine, based on an indication of the third WUS, whether to enable the onDuration timer of the fifth DRX group in the next DRX cycle.

For example, a WUS 1 corresponds to a DRX group 1, a WUS 2 corresponds to a DRX group 2, and both the WUS 1 and the WUS 2 are configured in the DRX group 1. If a time domain location of the WUS 2 is in an active time of the DRX group 1 and an active time of the DRX group 2, receiving of the WUS 2 may be quit, and the WUS 2 may be received in a case that the time domain location of the WUS 2 is not in the active time of the DRX group 1 or the active time of the DRX group 2.

In this way, it is determined, based on a relationship between a time domain location of each WUS and an active time of a DRX group in which a WUS is configured and/or an active time of a corresponding DRX group, whether to receive a WUS corresponding to each DRX group, so that transmission resources and power can be saved.

In some embodiments, at least two WUSs are configured for the terminal device, the at least two WUSs are configured in a sixth DRX group of the at least two DRX groups, and step 601 includes one of the following:

receiving a fourth WUS in a case that a time domain location of the fourth WUS is in a non-active time of the sixth DRX group;

receiving the fourth WUS in a case that the time domain location of the fourth WUS is in a non-active time of a seventh DRX group; and receiving the fourth WUS in a case that the time domain location of the fourth WUS is in the non-active time of the sixth DRX group and the non-active time of the seventh DRX group, where the fourth WUS is a WUS corresponding to the seventh DRX group, and the seventh DRX group is a DRX group other than the sixth DRX group in the at least two DRX groups.

In this embodiment, in a case that at least two WUSs are configured for the terminal device, and the at least two WUSs are configured in a same DRX group, for example, the at least two WUSs are configured in the sixth DRX group in the at least two DRX groups, for a WUS corresponding to a DRX group other than the sixth DRX group in the at least two DRX groups, whether the WUS needs to be received may be determined based on a relationship between a time domain location thereof and the non-active time of the sixth DRX group and/or a non-active time of the corresponding DRX group. Specifically, a plurality of different manners may be included:

In one manner, whether the fourth WUS is to be received may be determined based on whether the time domain location of the fourth WUS is in the non-active time of the sixth DRX group, where the fourth WUS is a WUS corresponding to the seventh DRX group, and the seventh DRX group is a DRX group other than the sixth DRX group in the at least two DRX groups.

Specifically, in a case that the time domain location of the fourth WUS is in the non-active time of the sixth DRX group, it is determined that the time domain location of the fourth WUS does not conflict with the active time of the sixth DRX group. Because the sixth DRX group is currently in a sleep state, that is, a PDCCH is not monitored, and a difficulty in simultaneous detection does not exist, the fourth WUS may be received, to determine, based on an indication of the fourth WUS, whether to enable an onDuration timer of the seventh DRX group in a next DRX cycle.

It should be noted that, in this manner, the fourth WUS may be received only in a case that the time domain location of the fourth WUS is in the non-active time of the sixth DRX group, and the fourth WUS is not received in other cases. In other words, receiving of the fourth WUS may be quit as long as the time domain location of the fourth WUS is not in the non-active time of the sixth DRX group.

For example, a WUS 1 corresponds to a DRX group 1, a WUS 2 corresponds to a DRX group 2, and both the WUS 1 and the WUS 2 are configured in the DRX group 1. If a time domain location of the WUS 2 is in a non-active time of the DRX group 1, the WUS 2 may be received, and receiving of the WUS 2 may be quit in a case that the time domain location of the WUS 2 is not in the non-active time of the DRX group 1.

In another manner, whether to receive the fourth WUS may be determined based on whether the time domain location of the fourth WUS is in the non-active time of the seventh DRX group.

Specifically, in a case that the time domain location of the fourth WUS is in the non-active time of the seventh DRX group, it is determined that the time domain location of the fourth WUS does not conflict with an active time of the seventh DRX group. There is no data transmission in the seventh DRX group, it is better to indicate whether there is data transmission in a next DRX cycle through a corresponding WUS. Therefore, the fourth WUS may be received, to determine, based on an indication of the fourth WUS, whether to enable an onDuration timer of the seventh DRX group in a next DRX cycle.

It should be noted that, in this manner, the fourth WUS may be received only in a case that the time domain location of the fourth WUS is in the non-active time of the seventh DRX group, and receiving of the fourth WUS is quit in other cases. In other words, as long as the time domain location of the fourth WUS is not in the non-active time of the seventh DRX group, receiving of the fourth WUS may be quit, and the onDuration timer of the seventh DRX group in the next DRX cycle is directly enabled.

For example, a WUS 1 corresponds to a DRX group 1, a WUS 2 corresponds to a DRX group 2, and both the WUS 1 and the WUS 2 are configured in the DRX group 1. If a time domain location of the WUS 2 is in a non-active time of the DRX group 2, the WUS 2 may be received, and receiving of the WUS 2 may be quit in a case that the time domain location of the WUS 2 is not in the non-active time of the DRX group 2.

In still another manner, whether to receive the fourth WUS may be determined based on whether the time domain location of the fourth WUS is in the non-active time of the sixth DRX group and the non-active time of the seventh DRX group.

Specifically, in a case that the time domain location of the fourth WUS is in the non-active time of the sixth DRX group and the non-active time of the seventh DRX group, it may be determined that the time domain location of the fourth WUS does not conflict with the non-active time of the sixth DRX group or the non-active time of the seventh DRX group, so that the fourth WUS may be received, to determine, based on an indication of the fourth WUS, whether to enable an onDuration timer of the seventh DRX group in a next DRX cycle.

It should be noted that, in this manner, the fourth WUS may be received only in a case that the time domain location of the fourth WUS is in the non-active time of the sixth DRX group and the non-active time of the seventh DRX group, and receiving of the fourth WUS is quit in other cases. In other words, receiving of the fourth WUS may be quit as long as the time domain location of the fourth WUS is not in the non-active time of the sixth DRX group or the non-active time of the seventh DRX group, to determine, based on an indication of the fourth WUS, whether to enable the onDuration timer of the seventh DRX group in the next DRX cycle.

For example, a WUS 1 corresponds to a DRX group 1, a WUS 2 corresponds to a DRX group 2, and both the WUS 1 and the WUS 2 are configured in the DRX group 1. If a time domain location of the WUS 2 is in a non-active time of the DRX group 1 and a non-active time of the DRX group 2, the WUS 2 may be received, and receiving of the WUS 2 may be quit in a case that the time domain location of the WUS 2 is not in the non-active time of the DRX group 1 or the non-active time of the DRX group 2.

In this way, it is determined, based on a relationship between a time domain location of each WUS and a non-active time of a DRX group in which a WUS is configured and/or a non-active time of a corresponding DRX group, whether to receive a WUS corresponding to each DRX group, so that a service of the terminal can be better ensured.

In this embodiment of the present disclosure, in a case that the at least two WUSs are configured in a same DRX group, WUS configurations are all bound to a same DRX group or on a same carrier CC, to indicate whether to enable different DRX groups to wake up or sleep. For example, two DRXs (a DRX group 1 and a DRX group 2) and two WUSs (a WUS 1 and a WUS 2) are configured in FIG. 4*a*. When an active time of the DRX group 1 conflicts with the WUS 1 or the WUS 2, UE may quit monitoring the WUS 1 or the WUS 2, and enable an onDuration timer of a corresponding DRX group in a next DRX cycle and monitor a PDCCH. Details are as follows:

If the active time of the DRX group 1 conflicts with a time window of the WUS 1, it indicates that data of the DRX group 1 is in a continuous scheduling stage, and therefore the UE may not monitor the WUS 1 in this case, but directly enable an onDuration timer of the corresponding DRX group 1 in a next DRX cycle and monitor a PDCCH.

If the active time of the DRX group 1 conflicts with a time window of the WUS 2, it indicates that data of the DRX group 1 is in a continuous scheduling stage in this case, but whether the DRX group 2 is in an active time has different branches:

If the DRX group 2 is also in an active time, that is, the time window of the WUS 2 also falls within an active time of the DRX group 2. In this case, the WUS 2 does not need to be monitored, and an onDuration timer of the corresponding DRX group 2 in a next DRX cycle is directly enabled and a PDCCH is monitored.

If the DRX group 2 is in a non-active time, that is, the time window of the WUS 2 falls within a non-active time of the DRX group 2, there is no data transmission in the DRX group 2 in this case, and it is better to indicate whether there is data transmission in a next DRX cycle through the WUS 2. Therefore, the UE may detect the WUS 2 signal, and determine, based on an indication of the WUS 2, to enable the DRX group 2 to wake up or sleep. But in particular, because the DRX group 1 is in a PDCCH monitoring state in this case, the WUS 2 and the PDCCH may be configured differently for the UE, and there is a difficulty in simultaneous detection. Therefore, the WUS 2 may not be monitored, and an onDuration timer of the corresponding DRX group 2 in a next DRX cycle is directly enabled or a PDCCH is monitored.

If the time window of the WUS 2 is in a non-active time of the DRX group 1, it indicates that there is no data transmission in the DRX group 1 in this case, but whether the DRX group 2 is in an active time has different branches:

If the DRX group 2 is in an active time, that is, the time window of the WUS 2 falls within an active time of the DRX group 2. In this case, as required, the WUS 2 does not need to be monitored, and an onDuration timer of the corresponding DRX group 2 in a next DRX cycle is directly enabled and a PDCCH is monitored. However, because the DRX group 1 is currently in an idle state, monitoring of the WUS 2 may also be considered, and it is determined, based on an indication of the WUS 2, whether to enable the DRX group 2 to wake up or sleep.

If the DRX group 2 is also in a non-active time, that is, the time window of the WUS 2 falls within a non-active time of the DRX group 2, and there is no data transmission in the two DRX groups in this case, the UE may detect the WUS 2 signal, and determine, based on an indication of the WUS 2, whether to enable the DRX group 2 to wake up or sleep.

In some embodiments, in a case that one WUS is configured for the terminal device, before step 601, the method further includes:

determining, based on states of a part or all of the at least two DRX groups, whether to receive the WUS.

In a process of using one WUS to control wake-up/sleep states of a plurality of DRX groups, a special case also needs to be further considered and resolved. For example, when a data service is being performed in a part of DRX groups of UE, these DRX groups are already in a wake-up working state, and in this case, it may be considered whether to monitor a WUS, that is, to receive the WUS.

In this implementation, before the WUS is received, it may be determined, based on the states of the part or all of the at least two DRX groups, whether to receive the WUS. If yes, the WUS is received; otherwise, the WUS may not be received, that is, receiving of the WUS is quit.

Specifically, whether to receive the WUS may be determined based on whether the part or all of the at least two DRX groups are in an active state (a wake-up state) or a non-active state (a sleep state) at a current moment. More specifically, in a case that the part or all of the at least two DRX groups are in an active state at the current moment, it may be determined not to receive the WUS, and in a case that the part or all of the at least two DRX groups are in a non-active state at the current moment, it is determined to receive the WUS.

Further, in a case that it is determined not to receive the WUS, considering that the part or all of the DRX groups are currently in an active state, it is determined that a service is likely to be performed in the part or all of the DRX groups of in a next DRX cycle. Therefore, to ensure normal execution of the service of the UE and reduce a transmission latency, onDuration timers of the part or all of the DRX groups in a next DRX cycle that are currently in an active state may be directly enabled without monitoring the WUS.

In this way, it is determined, based on the states of the part or all of the at least two DRX groups, whether to receive the WUS, so that transmission resources and power can be saved without affecting a service of the terminal.

Further, the determining, based on states of a part or all of the at least two DRX groups, whether to receive the WUS includes one of the following:

in a case that a time domain location of the WUS is in an active time of an eighth DRX group, determining to quit receiving the WUS; otherwise, determining to receive the WUS, where the eighth DRX group is a DRX group in which the WUS is configured in the at least two DRX groups;

in a case that the time domain location of the WUS is in an active time of each of the at least two DRX groups, determining to quit receiving the WUS; otherwise, determining to receive the WUS; and in a case that the time domain location of the WUS is in an active time of any one of the at least two DRX groups, determining to quit receiving the WUS; otherwise, determining to receive the WUS.

In other words, in this implementation, it may be determined, based on a case that the time domain location of the WUS overlaps with active times of a part or all of the at least two DRX groups, whether to receive the WUS or quit receiving the WUS.

When a time domain location of a configured WUS overlaps an active time, the UE is still in an active state of monitoring at a time location at which the WUS should be monitored due to a scheduling state of a previous DRX cycle, namely, a continuous PDCCH monitoring state. In this case, the WUS may not need to be monitored, and a continuous active state is directly entered, that is, an onDuration timer is enabled and a PDCCH is monitored in a next DRX cycle.

In one manner, only whether a primary DRX group is in an active time may be considered to determine whether the WUS is in the active time, that is, whether the time domain location of the WUS conflicts with the active time, so that it is further determined, based on whether there is a conflict, whether to monitor the WUS, where the primary DRX group may be a DRX group in which the WUS is configured in the at least two DRX groups.

Specifically, when the WUS is configured in the eighth DRX group in the at least two DRX groups, in a case that the time domain location of the WUS is in the active time of the eighth DRX group, that is, when the time domain location of the WUS overlaps with the active time of the eighth DRX group, it may be determined that the time domain location of the WUS conflicts with the active time of the eighth DRX group, so that it is determined to quit receiving the WUS. In a case that the time domain location of the WUS is not in the active time of the eighth DRX group or the time domain location of the WUS is in a non-active time (Non-Active time) of the eighth DRX group, that is, the time domain location of the WUS does not overlap with the active time of the eighth DRX group, it may be determined that the time domain location of the WUS does not conflict with the active time of the eighth DRX group, so that it is determined to receive the WUS.

In another manner, the active time of each of the at least two DRX groups may be considered to determine whether the time domain location of the WUS conflicts with the active time, so that it is further determined, based on whether there is a conflict, whether to monitor the WUS. Specifically, two different cases may be included:

In one case, in a case that the time domain location of the WUS is in the active time of each of the at least two DRX groups, that is, the time domain location of the WUS overlaps with the active time of each DRX group, it may be determined that the time domain location of the WUS conflicts with the active time of each DRX group, so that it is determined to quit receiving the WUS. In a case that the time domain location of the WUS is not in the active time of each DRX group, that is, when the at least one DRX group does not overlap with the time domain location of the WUS, it may be determined that the time domain location of the WUS does not conflict with the active times of the at least two DRX groups, so that it is determined to receive the WUS.

In another case, in a case that the time domain location of the WUS is in the active time of any one of the at least two DRX groups, that is, the active time of the at least one DRX group overlaps with the time domain location of the WUS, it may be determined that the time domain location of the WUS conflicts with the active times of the at least two DRX groups, so that it is determined to quit receiving the WUS. In a case that the time domain location of the WUS is not in the active time of any DRX group, that is, when the time domain location of the WUS is in a non-active time of each DRX group and no DRX group overlaps with the time domain location of the WUS, it may be determined that the time domain location of the WUS does not conflict with the active times of the at least two DRX groups, so that it is determined to receive the WUS.

In this way, it is determined, based on a relationship between the time domain location of the WUS and the active times of the part or all of the at least two DRX groups, whether the WUS conflicts with the at least two DRX groups, to determine whether to receive the WUS, so that transmission resources and power can be effectively saved.

Further, in a case that it is determined to quit receiving the WUS, the method further includes one of the following:

enabling an onDuration timer of a ninth DRX group in a next DRX cycle, where the ninth DRX group is a DRX group in which the WUS is configured in the at least two DRX groups; and enabling an onDuration timer of each of the at least two DRX groups in a next DRX cycle.

In the foregoing case of determining to quit receiving the WUS, conflicts occur when the time domain location of the WUS is in the active times of the part or all of the DRX groups, and the WUS does not need to be monitored, that is, service transmission is currently being performed in the part or all of the DRX groups. Therefore, it may be inferred that the UE is likely to perform a service in a next DRX cycle, to ensure normal execution of the service of the UE and reduce a transmission latency. In a case the WUS is not monitored, the onDuration timer of the DRX group in which the WUS is configured in the at least two DRX groups in the next cycle may be directly enabled, to ensure a data service of the DRX group in which the WUS is configured, or the onDuration timer of each of the at least two DRX groups in the next cycle may be directly enabled, to comprehensively ensure a data service of the terminal device.

It should be noted that the ninth DRX group and the eighth DRX group may be a same DRX group.

In some embodiments, the method further includes:
in a case that a WUS fails to be received, determining, based on a first indication, whether to enable an onDuration timer of a DRX group corresponding to the WUS that fails to be received in a next DRX cycle, where
the first indication is predefined in a protocol or configured by a network side device.

In some embodiments, the first indication includes one sub-indication, and the sub-indication corresponds to all of the at least two DRX groups; or the first indication includes at least two sub-indications, and the at least two sub-indications separately correspond to different DRX groups of the at least two DRX groups.

For the foregoing optional implementation, refer to the related descriptions in the embodiment shown in FIG. 2. To avoid repetition, details are not described in this embodiment.

In the wake-up signal processing method in this embodiment, in a case that at least two DRX groups are configured for a terminal device, one WUS including at least two indication bits or at least two WUSs corresponding to different DRX groups of the at least two DRX groups are configured, so that the at least two indication bits in the WUS or the at least two WUSs are used to separately indicate different DRX groups of the at least two DRX groups. In this way, after receiving a WUS, the terminal device may determine, based on an indication of a WUS corresponding to each DRX group, whether to wake up the corresponding DRX group, so that different DRX groups of the at least two DRX groups can be separately indicated. Therefore, the indication of the WUS is more flexible and power saving.

Referring to FIG. 7, FIG. 7 is a structural diagram of a network side device according to an embodiment of the present disclosure. As shown in FIG. 7, a network side device 700 includes:
a configuration module 701, configured to: in a case that at least two discontinuous reception DRX groups are configured for a terminal device, configure one wake-up signal WUS or at least two WUSs for the terminal device, where
the WUS includes at least two indication bits, the at least two indication bits separately correspond to different DRX groups of the at least two DRX groups, and each of the at least two indication bits is used to indicate whether to enable an onDuration timer of a DRX group corresponding to each indication bit in a next DRX cycle; and the at least two WUSs separately correspond to different DRX groups of the at least two DRX groups, and each of the at least two WUSs is used to indicate whether to enable an onDuration timer of a DRX group corresponding to each WUS in a next DRX cycle.

In some embodiments, the at least two WUSs are configured in a same DRX group of the at least two DRX groups, or configured in different DRX groups of the at least two DRX groups.

In some embodiments, the at least two WUSs are configured on different transmission resources of a same DRX group of the at least two DRX groups; and
the transmission resource includes at least one of the following: a time domain location, a frequency domain location, a search space, and a carrier.

In some embodiments, the at least two WUSs are configured in a first DRX group, and the first DRX group is a DRX group corresponding to a primary cell Pcell or a special cell Spcell in the at least two DRX groups.

In some embodiments, the network side device 700 further includes:
a sending module, configured to send a first indication to the terminal device, where
the first indication is used to indicate whether to enable an onDuration timer of a DRX group corresponding to a WUS that fails to be received in a next DRX cycle.

In some embodiments, the first indication includes one sub-indication, and the sub-indication corresponds to all of the at least two DRX groups; or the first indication includes at least two sub-indications, and the at least two sub-indications separately correspond to different DRX groups of the at least two DRX groups.

The network side device 700 provided in this embodiment of the present disclosure can implement the processes implemented by the network side device in the foregoing method embodiment. To avoid repetition, details are not described herein again.

In this embodiment of the present disclosure, in a case that a network side device 700 configures at least two DRX groups for a terminal device, one WUS including at least two indication bits or at least two WUSs corresponding to different DRX groups of the at least two DRX groups are configured for the terminal device, so that the at least two indication bits in the WUS or the at least two WUSs are used to separately indicate different DRX groups of the at least two DRX groups. In this way, the terminal device may determine, based on an indication of a WUS corresponding to each DRX group, whether to wake up the corresponding DRX group, so that different DRX groups of the at least two DRX groups can be separately indicated. Therefore, the indication of the WUS is more flexible and power saving.

Referring to FIG. 8, FIG. 8 is a structural diagram of a terminal device according to an embodiment of the present disclosure. As shown in FIG. 8, a terminal device 800 includes:
a receiving module 801, configured to receive a wake-up signal WUS in a case that at least two discontinuous reception DRX groups are configured, where
one WUS or at least two WUSs are configured for the terminal device, the WUS includes at least two indication bits, the at least two indication bits separately correspond to different DRX groups of the at least two DRX groups, and each of the at least two indication bits is used to indicate whether to enable an onDuration timer of a DRX group corresponding to each indication bit in a next DRX cycle; and the at least two WUSs separately correspond to different DRX groups of the at least two DRX groups, and each of the at least two WUSs is used to indicate whether to enable an onDuration timer of a DRX group corresponding to each WUS in a next DRX cycle.

In some embodiments, the at least two WUSs are configured in a same DRX group of the at least two DRX groups, or configured in different DRX groups of the at least two DRX groups.

In some embodiments, the at least two WUSs are configured on different transmission resources of a same DRX group of the at least two DRX groups; and
the transmission resource includes at least one of the following: a time domain location, a frequency domain location, a search space, and a carrier.

In some embodiments, the at least two WUSs are configured in a first DRX group, and the first DRX group is a DRX group corresponding to a Pcell or a Spcell in the at least two DRX groups.

In some embodiments, at least two WUSs are configured for the terminal device, and the terminal device 800 further includes:
a first processing module, configured to: in a case that a time domain location of a first WUS is in an active time of a second DRX group, quit receiving the first WUS, and enable an onDuration timer of the second DRX group in a next DRX cycle, where
the first WUS is a WUS corresponding to the second DRX group, and the second DRX group is a DRX group in which a WUS is configured in the at least two DRX groups.

In some embodiments, at least two WUSs are configured for the terminal device, and the receiving module 801 is specifically configured to receive a second WUS in a case that a time domain location of the second WUS is in a non-active time of a third DRX group, where
the second WUS is a WUS corresponding to the third DRX group, and the third DRX group is a DRX group in which a WUS is configured in the at least two DRX groups.

In some embodiments, at least two WUSs are configured for the terminal device, the at least two WUSs are configured in a fourth DRX group of the at least two DRX groups, the terminal device 800 further includes a second processing module, and the second processing module is specifically configured to perform one of the following:
in a case that a time domain location of a third WUS is in an active time of the fourth DRX group, quitting receiving the third WUS, and enabling an onDuration timer of a fifth DRX group in a next DRX cycle;
in a case that the time domain location of the third WUS is in an active time of the fifth DRX group, quitting receiving the third WUS, and enabling the onDuration timer of the fifth DRX group in the next DRX cycle; and
in a case that the time domain location of the third WUS is in the active time of the fourth DRX group and the active time of the fifth DRX group, quitting receiving the third WUS, and enabling the onDuration timer of the fifth DRX group in the next DRX cycle, where
the third WUS is a WUS corresponding to the fifth DRX group, and the fifth DRX group is a DRX group other than the fourth DRX group in the at least two DRX groups.

In some embodiments, at least two WUSs are configured for the terminal device, the at least two WUSs are configured in a sixth DRX group of the at least two DRX groups, and the receiving module 801 is specifically configured to perform one of the following:
receiving a fourth WUS in a case that a time domain location of the fourth WUS is in a non-active time of the sixth DRX group;
receiving the fourth WUS in a case that the time domain location of the fourth WUS is in a non-active time of a seventh DRX group; and
receiving the fourth WUS in a case that the time domain location of the fourth WUS is in the non-active time of the sixth DRX group and the non-active time of the seventh DRX group, where
the fourth WUS is a WUS corresponding to the seventh DRX group, and the seventh DRX group is a DRX group other than the sixth DRX group in the at least two DRX groups.

In some embodiments, one WUS is configured for the terminal device, and the terminal device 800 further includes:
a first determining module, configured to determine, based on states of a part or all of the at least two DRX groups, whether to receive the WUS.

In some embodiments, the first determining module is specifically configured to perform one of the following:
in a case that a time domain location of the WUS is in an active time of an eighth DRX group, determining to quit receiving the WUS; otherwise, determining to receive the WUS, where the eighth DRX group is a DRX group in which the WUS is configured in the at least two DRX groups;
in a case that the time domain location of the WUS is in an active time of each of the at least two DRX groups, determining to quit receiving the WUS; otherwise, determining to receive the WUS; and
in a case that the time domain location of the WUS is in an active time of any one of the at least two DRX groups, determining to quit receiving the WUS; otherwise, determining to receive the WUS.

In some embodiments, the terminal device 800 further includes an enabling module, and the enabling module is specifically configured to perform one of the following:
enabling an onDuration timer of a ninth DRX group in a next DRX cycle in a case that it is determined to quit receiving the WUS, where the ninth DRX group is a DRX group in which the WUS is configured in the at least two DRX groups; and
enabling an onDuration timer of each of the at least two DRX groups in a next DRX cycle in a case that it is determined to quit receiving the WUS.

In some embodiments, the terminal device 800 further includes:
a second determining module, configured to: in a case that a WUS fails to be received, determine, based on a first indication, whether to enable an onDuration timer of a DRX group corresponding to the WUS that fails to be received in a next DRX cycle, where
the first indication is predefined in a protocol or configured by a network side device.

In some embodiments, the first indication includes one sub-indication, and the sub-indication corresponds to all of the at least two DRX groups; or the first indication includes at least two sub-indications, and the at least two sub-indications separately correspond to different DRX groups of the at least two DRX groups.

The terminal device 800 provided in this embodiment of the present disclosure can implement the processes implemented by the terminal device in the foregoing method embodiment. To avoid repetition, details are not described herein again.

Figure 9:
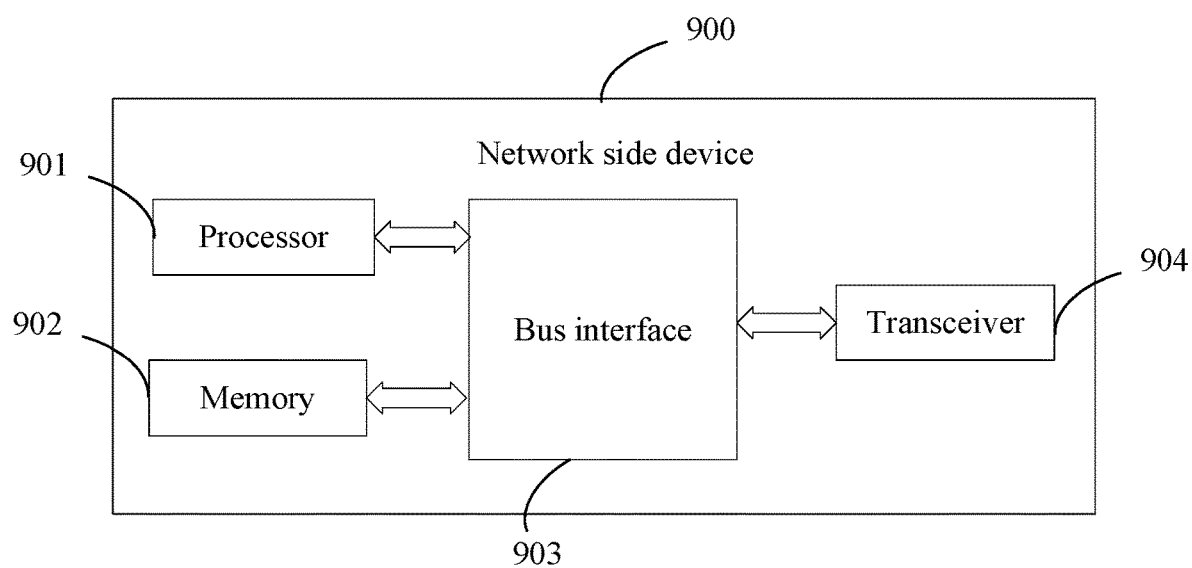
FIG. 9 is a structural diagram of a network side device according to still another embodiment of the present disclosure.

In this embodiment of the present disclosure, in a case that at least two DRX groups are configured for a terminal device 800, one WUS including at least two indication bits or at least two WUSs corresponding to different DRX groups of the at least two DRX groups are configured, so that the at least two indication bits in the WUS or the at least two WUSs are used to separately indicate different DRX groups of the at least two DRX groups. In this way, after receiving a WUS, the terminal device may determine, based on an indication of a WUS corresponding to each DRX group, whether to wake up the corresponding DRX group, so that different DRX groups of the at least two DRX groups can be separately indicated. Therefore, the indication of the WUS is more flexible and power saving. Referring to FIG. 9, FIG. 9 is a structural diagram of a network side device according to still another embodiment of the present disclosure. As shown in FIG. 9, a network side device 900 includes a processor 901, a memory 902, a bus interface 903, and a transceiver 904, where the processor 901, the memory 902, and the transceiver 904 are all connected to the bus interface 903.

In this embodiment of the present disclosure, the network side device 900 further includes a computer program that is stored in the memory 902 and that can be run on the processor 901, and when the computer program is executed by the processor 901, the following step is implemented:

in a case that at least two discontinuous reception DRX groups are configured for a terminal device, configuring one wake-up signal WUS or at least two WUSs for the terminal device, where the WUS includes at least two indication bits, the at least two indication bits separately correspond to different DRX groups of the at least two DRX groups, and each of the at least two indication bits is used to indicate whether to enable an onDuration timer of a DRX group corresponding to each indication bit in a next DRX cycle; and the at least two WUSs separately correspond to different DRX groups of the at least two DRX groups, and each of the at least two WUSs is used to indicate whether to enable an onDuration timer of a DRX group corresponding to each WUS in a next DRX cycle.

In some embodiments, the at least two WUSs are configured in a same DRX group of the at least two DRX groups, or configured in different DRX groups of the at least two DRX groups.

In some embodiments, the at least two WUSs are configured on different transmission resources of a same DRX group of the at least two DRX groups; and the transmission resource includes at least one of the following: a time domain location, a frequency domain location, a search space, and a carrier.

In some embodiments, the at least two WUSs are configured in a first DRX group, and the first DRX group is a DRX group corresponding to a primary cell Pcell or a special cell Spcell in the at least two DRX groups.

In some embodiments, when the computer program is executed by the processor 901, the following step is implemented:

sending a first indication to the terminal device, where the first indication is used to indicate whether to enable an onDuration timer of a DRX group corresponding to a WUS that fails to be received in a next DRX cycle.

In some embodiments, the first indication includes one sub-indication, and the sub-indication corresponds to all of the at least two DRX groups; or the first indication includes at least two sub-indications, and the at least two sub-indications separately correspond to different DRX groups of the at least two DRX groups.

In this embodiment of the present disclosure, in a case that a network side device 1500 configures at least two DRX groups for a terminal device, one WUS including at least two indication bits or at least two WUSs corresponding to different DRX groups of the at least two DRX groups are configured for the terminal device, so that the at least two indication bits in the WUS or the at least two WUSs are used to separately indicate different DRX groups of the at least two DRX groups. In this way, the terminal device may determine, based on an indication of a WUS corresponding to each DRX group, whether to wake up the corresponding DRX group, so that different DRX groups of the at least two DRX groups can be separately indicated. Therefore, the indication of the WUS is more flexible and power saving.

Figure 10:
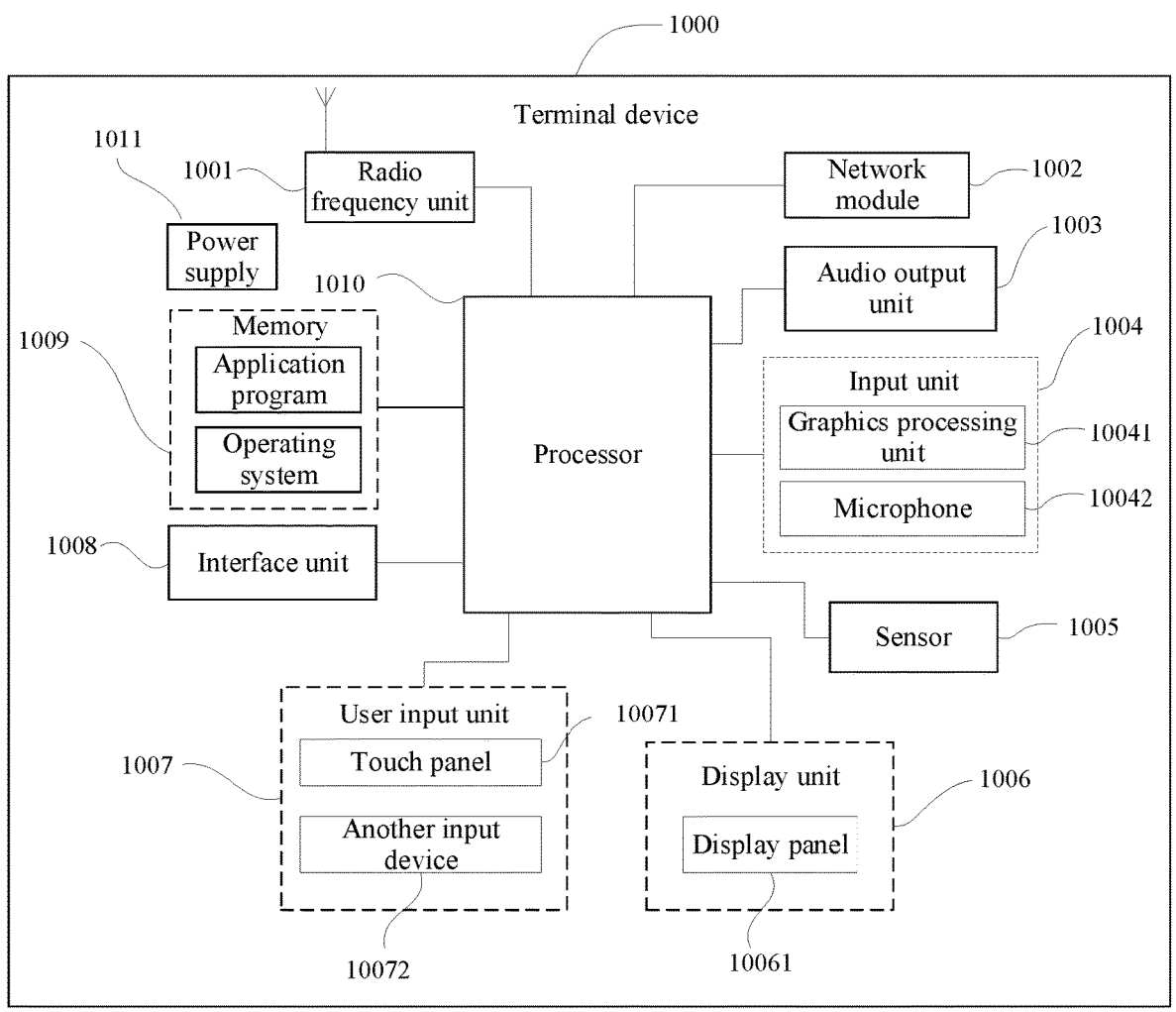
FIG. 10 is a structural diagram of a terminal device according to still another embodiment of the present disclosure.

FIG. 10 is a structural diagram of still another terminal device according to an embodiment of the present disclosure. Referring to FIG. 10, a terminal device 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, a processor 1010, and a power supply 1011. It can be understood by a person skilled in the art that, the terminal device structure shown in FIG. 10 does not constitute any limitation on the terminal device, and the terminal device may include more or fewer components than those shown in the figure, or combine some components, or have different component arrangements. In this embodiment of the present disclosure, the terminal device includes but is not limited to a mobile phone, a tablet computer, a notebook computer, a palmtop computer, an in-vehicle terminal, a wearable device, a pedometer, and the like.

The radio frequency unit 1001 is configured to receive a wake-up signal WUS in a case that at least two discontinuous reception DRX groups are configured, where one WUS or at least two WUSs are configured for the terminal device, the WUS includes at least two indication bits, the at least two indication bits separately correspond to different DRX groups of the at least two DRX groups, and each of the at least two indication bits is used to indicate whether to enable an onDuration timer of a DRX group corresponding to each indication bit in a next DRX cycle; and the at least two WUSs separately correspond to different DRX groups of the at least two DRX groups, and each of the at least two WUSs is used to indicate whether to enable an onDuration timer of a DRX group corresponding to each WUS in a next DRX cycle.

In some embodiments, the at least two WUSs are configured in a same DRX group of the at least two DRX groups, or configured in different DRX groups of the at least two DRX groups.

In some embodiments, the at least two WUSs are configured on different transmission resources of a same DRX group of the at least two DRX groups; and the transmission resource includes at least one of the following: a time domain location, a frequency domain location, a search space, and a carrier.

In some embodiments, the at least two WUSs are configured in a first DRX group, and the first DRX group is a DRX group corresponding to a Pcell or a Spcell in the at least two DRX groups.

In some embodiments, at least two WUSs are configured for the terminal device, and the processor 1610 is further configured to: in a case that a time domain location of a first WUS is in an active time of a second DRX group, quit receiving the first WUS, and enable an onDuration timer of the second DRX group in a next DRX cycle, where
the first WUS is a WUS corresponding to the second DRX group, and the second DRX group is a DRX group in which a WUS is configured in the at least two DRX groups.

In some embodiments, at least two WUSs are configured for the terminal device, and the radio frequency unit 1001 is further configured to:
receive a second WUS in a case that a time domain location of the second WUS is in a non-active time of a third DRX group, where
the second WUS is a WUS corresponding to the third DRX group, and the third DRX group is a DRX group in which a WUS is configured in the at least two DRX groups.

In some embodiments, at least two WUSs are configured for the terminal device, the at least two WUSs are configured in a fourth DRX group of the at least two DRX groups, and the processor 1610 is further configured to perform one of the following:
in a case that a time domain location of a third WUS is in an active time of the fourth DRX group, quitting receiving the third WUS, and enabling an onDuration timer of a fifth DRX group in a next DRX cycle;
in a case that the time domain location of the third WUS is in an active time of the fifth DRX group, quitting receiving the third WUS, and enabling the onDuration timer of the fifth DRX group in the next DRX cycle; and
in a case that the time domain location of the third WUS is in the active time of the fourth DRX group and the active time of the fifth DRX group, quitting receiving the third WUS, and enabling the onDuration timer of the fifth DRX group in the next DRX cycle, where
the third WUS is a WUS corresponding to the fifth DRX group, and the fifth DRX group is a DRX group other than the fourth DRX group in the at least two DRX groups.

In some embodiments, at least two WUSs are configured for the terminal device, the at least two WUSs are configured in a sixth DRX group of the at least two DRX groups, and the radio frequency unit 1601 is further configured to perform one of the following:
receiving a fourth WUS in a case that a time domain location of the fourth WUS is in a non-active time of the sixth DRX group;
receiving the fourth WUS in a case that the time domain location of the fourth WUS is in a non-active time of a seventh DRX group; and
receiving the fourth WUS in a case that the time domain location of the fourth WUS is in the non-active time of the sixth DRX group and the non-active time of the seventh DRX group, where
the fourth WUS is a WUS corresponding to the seventh DRX group, and the seventh DRX group is a DRX group other than the sixth DRX group in the at least two DRX groups.

In some embodiments, one WUS is configured for the terminal device, and the processor 1610 is further configured to:
determine, based on states of a part or all of the at least two DRX groups, whether to receive the WUS.

In some embodiments, the processor 1610 is further configured to perform one of the following:
in a case that a time domain location of the WUS is in an active time of an eighth DRX group, determining to quit receiving the WUS; otherwise, determining to receive the WUS, where the eighth DRX group is a DRX group in which the WUS is configured in the at least two DRX groups;
in a case that the time domain location of the WUS is in an active time of each of the at least two DRX groups, determining to quit receiving the WUS; otherwise, determining to receive the WUS; and
in a case that the time domain location of the WUS is in an active time of any one of the at least two DRX groups, determining to quit receiving the WUS; otherwise, determining to receive the WUS.

In some embodiments, the processor 1610 is further configured to perform one of the following:
enabling an onDuration timer of a ninth DRX group in a next DRX cycle in a case that it is determined to quit receiving the WUS, where the ninth DRX group is a DRX group in which the WUS is configured in the at least two DRX groups; and
enabling an onDuration timer of each of the at least two DRX groups in a next DRX cycle in a case that it is determined to quit receiving the WUS.

In some embodiments, the processor 1610 is further configured to:
in a case that a WUS fails to be received, determine, based on a first indication, whether to enable an onDuration timer of a DRX group corresponding to the WUS that fails to be received in a next DRX cycle, wherein
the first indication is predefined in a protocol or configured by a network side device.

In some embodiments, the first indication includes one sub-indication, and the sub-indication corresponds to all of the at least two DRX groups; or the first indication includes at least two sub-indications, and the at least two sub-indications separately correspond to different DRX groups of the at least two DRX groups.

In this embodiment of the present disclosure, in a case that at least two DRX groups are configured for a terminal device 1600, one WUS including at least two indication bits or at least two WUSs corresponding to different DRX groups of the at least two DRX groups are configured, so that the at least two indication bits in the WUS or the at least two WUSs are used to separately indicate different DRX groups of the at least two DRX groups. In this way, after receiving a WUS, the terminal device may determine, based on an indication of a WUS corresponding to each DRX group, whether to wake up the corresponding DRX group, so that different DRX groups of the at least two DRX groups can be separately indicated. Therefore, the indication of the WUS is more flexible and power saving.

It should be understood that, in this embodiment of the present disclosure, the radio frequency unit 1001 may be configured to receive and send information or a signal in a call process. Specifically, after receiving downlink data from a base station, the radio frequency unit 1001 sends the downlink data to the processor 1010 for processing. In addition, the radio frequency unit 1001 sends uplink data to the base station. Usually, the radio frequency unit 1001 includes but is not limited to an antenna, at least one amplifier, a transceiver, a coupler, a low noise amplifier, a duplexer, and the like. In addition, the radio frequency unit 1001 may communicate with a network and another device through a wireless communication system.

The terminal device provides wireless broadband Internet access for the user by using the network module 1002, for example, helping the user to send and receive an e-mail, brows a web page, and access streaming media.

The audio output unit 1003 may convert audio data received by the radio frequency unit 1001 or the network module 1002 or stored in the memory 1009 into an audio signal and output the audio signal as a sound. In addition, the audio output unit 1003 may further provide an audio output (for example, a call signal received voice, or a message received voice) related to a specific function implemented by the terminal device 1000. The audio output unit 1003 includes a speaker, a buzzer, a telephone receiver, and the like.

The input unit 1004 is configured to receive an audio signal or a video signal. The input unit 1004 may include a Graphics Processing Unit (GPU) 10041 and a microphone 10042, and the graphics processing unit 10041 processes image data of a still picture or video obtained by an image capture apparatus (such as a camera) in a video capture mode or an image capture mode. A processed image frame may be displayed on the display unit 1006. The image frame processed by the graphics processor 10041 may be stored in the memory 1009 (or another storage medium) or sent by using the radio frequency unit 1001 or the network module 1002. The microphone 10042 may receive a sound and can process such sound into audio data. Processed audio data may be converted, in a call mode, into a format that can be sent to a mobile communication base station by using the radio frequency unit 1001 for output.

The terminal device 1000 further includes at least one sensor 1005, such as an optical sensor, a motion sensor, and other sensors. Specifically, the light sensor includes an ambient light sensor and a proximity sensor. The ambient light sensor may adjust luminance of the display panel 10061 based on brightness of ambient light. The proximity sensor may turn off the display panel 10061 and/or backlight when the terminal device 1000 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 1005 may further include a fingerprint sensor, a pressure sensor, an iris sensor, a molecular sensor, a gyroscope, a barometer, a hygrometer, a thermometer, an infrared sensor, and the like. Details are not described herein.

The display unit 1006 is configured to display information entered by a user or information provided for a user. The display unit 1006 may include a display panel 10061. The display panel 10061 may be configured in a form of a Liquid Crystal Display (LCD), an Organic Light-Emitting Diode (OLED), or the like.

The user input unit 1007 may be configured to receive input digit or character information, and generate a key signal input related to a user setting and function control of the terminal device. Specifically, the user input unit 1007 includes a touch panel 10071 and another input device 10072. The touch panel 10071 is also referred to as a touchscreen, and may collect a touch operation performed by a user on or near the touch panel 10071 (such as an operation performed by a user on the touch panel 10071 or near the touch panel 10071 by using any proper object or accessory, such as a finger or a stylus). The touch panel 10071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 1010, and can receive and execute a command sent by the processor 1010. In addition, the touch panel 10071 may be of a resistive type, a capacitive type, an infrared type, a surface acoustic wave type, or the like. The user input unit 1007 may include another input device 10072 in addition to the touch panel 10071. Specifically, the another input device 10072 may include but is not limited to a physical keyboard, a functional button (such as a volume control button or a power on/off button), a trackball, a mouse, and a joystick. Details are not described herein.

Further, the touch panel 10071 may cover the display panel 10061. When detecting the touch operation on or near the touch panel 10071, the touch panel 10071 transmits the touch operation to the processor 1010 to determine a type of a touch event, and then the processor 1010 provides corresponding visual output on the display panel 10061 based on the type of the touch event. In FIG. 10, although the touch panel 10071 and the display panel 10061 are used as two independent parts to implement input and output functions of the terminal device, in some embodiments, the touch panel 10071 and the display panel 10061 may be integrated to implement the input and output functions of the terminal device. This is not specifically limited herein.

The interface unit 1008 is an interface for connecting an external apparatus with the terminal device 1000. For example, the external apparatus may include a wired or wireless headphone port, an external power supply (or a battery charger) port, a wired or wireless data port, a storage card port, a port used to connect to an apparatus having an identity module, an audio Input/Output (I/O) port, a video I/O port, a headset port, and the like. The interface unit 1008 may be configured to receive input (for example, data information and power) from an external apparatus and transmit the received input to one or more elements in the terminal device 1000 or may be configured to transmit data between the terminal device 1000 and an external apparatus.

The memory 1009 may be configured to store a software program and various data. The memory 1009 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 1009 may include a high-speed random access memory, and may further include a nonvolatile memory, for example, at least one magnetic disk storage device, a flash storage device, or another volatile solid-state storage device.

The processor 1010 is a control center of the terminal device, is connected to each part of the entire terminal device by using various interfaces and lines, and performs various functions of the terminal device and data processing by running or executing the software program and/or the module that are/is stored in the memory 1009 and invoking data stored in the memory 1009, to perform overall monitoring on the terminal device. In some embodiments, the processor 1010 may include one or more processing units. Preferably, an application processor and a modem processor may be integrated into the processor 1010. The application processor mainly processes an operating system, a user interface, an application program, and the like. The modem processor mainly processes wireless communications. It can be understood that, in some embodiments, the modem processor may not be integrated into the processor 1010.

The terminal device 1000 may further include the power supply 1011 (such as a battery) that supplies power to each component. Preferably, the power supply 1011 may be logically connected to the processor 1010 by using a power supply management system, so as to implement functions such as charging and discharging management, and power consumption management by using the power supply management system.

In addition, the terminal device 1000 includes some function modules not shown, and details are not described herein.

Preferably, an embodiment of the present disclosure further provides a terminal device, including a processor 1010, a memory 1009, and a computer program that is stored in the memory 1009 and that can be run on the processor 1010. When the computer program is executed by the processor 1010, the processes of the foregoing wake-up signal processing method embodiment are implemented and a same technical effect can be achieved. To avoid repetition, details are not described herein again.

An embodiment of the present disclosure further provides a computer-readable storage medium. The computer-readable storage medium stores a computer program, and when the computer program is executed by a processor, the processes of the foregoing wake-up signal configuration method embodiment are implemented and a same technical effect can be achieved. To avoid repetition, details are not described herein again. The computer-readable storage medium includes a Read-only Memory (ROM), a Random Access Memory (RAM), a magnetic disk, or an optical disc.

An embodiment of the present disclosure further provides another computer-readable storage medium. The computer-readable storage medium stores a computer program, and when the computer program is executed by a processor, the processes of the foregoing wake-up signal processing method embodiment are implemented and a same technical effect can be achieved. To avoid repetition, details are not described herein again. The computer-readable storage medium includes a ROM, a RAM, a magnetic disk, an optical disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

The invention claimed is:

1. A Wake-Up Signal (WUS) configuration method performed by a network side device, the method comprising:
when at least two Discontinuous Reception (DRX) groups are configured for a terminal device,
configuring one WUS for the terminal device, and sending the one WUS via a communication link between the network side device and the terminal device, wherein the one WUS comprises at least two indication bits, the at least two indication bits separately correspond to different DRX groups of the at least two DRX groups, and each of the at least two indication bits indicates whether to enable an onDuration timer of a DRX group corresponding to each indication bit in a next DRX cycle; or
configuring at least two WUSs for the terminal device, and sending the at least two WUSs via the communication link between the network side device and the terminal device, wherein the at least two WUSs separately correspond to different DRX groups of the at least two DRX groups, and each of the at least two WUSs is used to indicate whether to enable an onDuration timer of a DRX group corresponding to each WUS in the next DRX cycle,
wherein the method further comprises:
sending, to the terminal device, a first indication which indicates whether to enable an onDuration timer of a DRX group corresponding to a WUS that fails to be received in the next DRX cycle.

2. The method according to claim 1, wherein the at least two WUSs are configured in a same DRX group of the at least two DRX groups, or configured in the different DRX groups of the at least two DRX groups.

3. The method according to claim 2, wherein the at least two WUSs are configured on different transmission resources of the same DRX group of the at least two DRX groups; and
the transmission resource comprise at least one of the following: a time domain location, a frequency domain location, a search space, or a carrier.

4. The method according to claim 2, wherein the at least two WUSs are configured in a first DRX group, and the first DRX group is a DRX group corresponding to a Primary Cell (Pcell) or a Special Cell (Spcell) in the at least two DRX groups.

5. The method according to claim 1, wherein the first indication comprises one sub-indication, and the one sub-indication corresponds to all of the at least two DRX groups; or the first indication comprises at least two sub-indications, and the at least two sub-indications separately correspond to the different DRX groups of the at least two DRX groups.

6. A Wake-Up Signal (WUS) processing method performed by a terminal device, the method comprising:
when at least two Discontinuous Reception (DRX) groups are configured for the terminal device, receiving one WUS via a communication link between a network side device and the terminal device, wherein the one WUS comprises at least two indication bits, the at least two indication bits separately correspond to different DRX groups of the at least two DRX groups, and each of the at least two indication bits is used to indicate whether to enable an onDuration timer of a DRX group corresponding to each indication bit in a next DRX cycle; and determining whether to enable the on Duration timer of the DRX group corresponding to each indication bit in the next DRX cycle based on the corresponding indication bit; or receiving at least two WUSs via the communication link between the network side device and the terminal device, wherein the at least two WUSs separately correspond to the different DRX groups of the at least two DRX groups, and each of the at least two WUSs is used to indicate whether to enable an on Duration timer of a DRX group corresponding to each WUS in the next DRX cycle; and determining whether to enable the on Duration timer of the DRX group corresponding to each WUS in the next DRX cycle based on the corresponding WUS, wherein the method further comprises:
when a WUS fails to be received, determining, based on a first indication, whether to enable an onDuration timer of a DRX group corresponding to the WUS that fails to be received in the next DRX cycle.

7. The method according to claim 6, wherein the at least two WUSs are configured in a same DRX group of the at least two DRX groups, or configured in the different DRX groups of the at least two DRX groups.

8. The method according to claim 7, wherein the at least two WUSs are configured on different transmission resources of the same DRX group of the at least two DRX groups; and the transmission resources comprise at least one of the following: a time domain location, a frequency domain location, a search space, or a carrier.

9. The method according to claim 6, wherein the at least two WUSs are configured in a first DRX group, and the first DRX group is a DRX group corresponding to a Primary Cell (Pcell) or a Special Cell (Spcell) in the at least two DRX groups.

10. The method according to claim 6, wherein the at least two WUSs are configured for the terminal device, and the method further comprises:

when a time domain location of a first WUS is in an active time of a second DRX group, quitting receiving the first WUS, and enabling an on Duration timer of the second DRX group in the next DRX cycle, wherein:
the first WUS is a WUS corresponding to the second DRX group, and the second DRX group is a DRX group in which the first WUS is configured in the at least two DRX groups.

11. The method according to claim 6, wherein the at least two WUSs are configured for the terminal device, and receiving-a-WUS the at least two WUSs comprises:
receiving a second WUS when a time domain location of the second WUS is in a non-active time of a third DRX group, wherein
the second WUS is a WUS corresponding to the third DRX group, and the third DRX group is a DRX group in which the second WUS is configured in the at least two DRX groups.

12. The method according to claim 6, wherein the at least two WUSs are configured for the terminal device, the at least two WUSs are configured in a fourth DRX group of the at least two DRX groups, and the method further comprises at least one of the following:

when a time domain location of a third WUS is in an active time of the fourth DRX group, quitting receiving the third WUS, and enabling an onDuration timer of a fifth DRX group in the next DRX cycle;
when the time domain location of the third WUS is in an active time of the fifth DRX group, quitting receiving the third WUS, and enabling the on Duration timer of the fifth DRX group in the next DRX cycle; or
when the time domain location of the third WUS is in the active time of the fourth DRX group and the active time of the fifth DRX group, quitting receiving the third WUS, and enabling the onDuration timer of the fifth DRX group in the next DRX cycle, wherein
the third WUS is a WUS corresponding to the fifth DRX group, and the fifth DRX group is a DRX group other than the fourth DRX group in the at least two DRX groups.

13. The method according to claim 6, wherein the at least two WUSs are configured for the terminal device, the at least two WUSs are configured in a sixth DRX group of the at least two DRX groups, and receiving the at least two WUSs comprises at least one of the following:

receiving a fourth WUS when a time domain location of the fourth WUS is in a non-active time of the sixth DRX group;
receiving the fourth WUS when the time domain location of the fourth WUS is in a non-active time of a seventh DRX group; or
receiving the fourth WUS when the time domain location of the fourth WUS is in the non-active time of the sixth DRX group and the non-active time of the seventh DRX group, wherein
the fourth WUS is a WUS corresponding to the seventh DRX group, and the seventh DRX group is a DRX group other than the sixth DRX group in the at least two DRX groups.

14. The method according to claim 6, wherein when the one WUS is configured for the terminal device, before receiving the one WUS, the method further comprises:
determining, based on states of a part or all of the at least two DRX groups, whether to receive the one WUS.

15. The method according to claim 14, wherein determining, based on the states of the part or all of the at least two DRX groups, whether to receive the one WUS comprises at least one of the following:

when a time domain location of the one WUS is in an active time of an eighth DRX group, determining to quit receiving the one WUS; otherwise, determining to receive the one WUS, wherein the eighth DRX group is a DRX group in which the one WUS is configured in the at least two DRX groups;
when the time domain location of the one WUS is in an active time of each of the at least two DRX groups, determining to quit receiving the one WUS; otherwise, determining to receive the one WUS; or
when the time domain location of the one WUS is in an active time of any one of the at least two DRX groups, determining to quit receiving the one WUS; otherwise, determining to receive the one WUS.

16. The method according to claim 15, wherein the method further comprises at least one of the following:

enabling an onDuration timer of a ninth DRX group in the next DRX cycle when it is determined to quit receiving the one WUS, wherein the ninth DRX group is a DRX group in which the one WUS is configured in the at least two DRX groups; or enabling an onDuration timer of each of the at least two DRX groups in the next DRX cycle when it is determined to quit receiving the one WUS.

17. The method according to claim 6, wherein
the first indication is predefined in a protocol or configured by the network side device.

18. The method according to claim 17, wherein the first indication comprises one sub-indication, and the one sub-indication corresponds to all of the at least two DRX groups; or the first indication comprises at least two sub-indications, and the at least two sub-indications separately correspond to the different DRX groups of the at least two DRX groups.

19. A terminal device, comprising a processor, a memory, and a computer program stored in the memory and configured to be executed by the processor, wherein the computer program, when executed by the processor, causes the processor to perform a Wake-Up Signal (WUS) processing method, wherein the WUS processing method comprises:

when at least two Discontinuous Reception (DRX) groups are configured for the terminal device,
receiving one WUS via a communication link between a network side device and the terminal device, wherein the one WUS comprises at least two indication bits, the at least two indication bits separately correspond to different DRX groups of the at least two DRX groups, and each of the at least two indication bits is used to indicate whether to enable an on Duration timer of a DRX group corresponding to each indication bit in a next DRX cycle; and determining whether to enable the on Duration timer of the DRX group corresponding to each indication bit in the next DRX cycle based on the corresponding indication bit; or receiving at least two WUSs via the communication link between the network side device and the terminal device, wherein the at least two WUSs separately correspond to the different DRX groups of the at least two DRX groups, and each of the at least two WUSs is used to indicate whether to enable an on Duration timer of a DRX group corresponding to each WUS in the next DRX cycle; and determining whether to enable the on Duration timer of the DRX group corresponding to each WUS in the next DRX cycle based on the corresponding WUS, wherein the method further comprises:

when a WUS fails to be received, determining based on a first indication, whether to enable an onDuration timer of a DRX group corresponding to the WUS that fails to be received in the next DRX cycle.

* * * * *